(12) United States Patent
Hu et al.

(10) Patent No.: US 10,609,282 B2
(45) Date of Patent: Mar. 31, 2020

(54) WIDE-AREA IMAGE ACQUIRING METHOD AND APPARATUS

(71) Applicant: Huawei Technologies Co., Ltd., Shenzhen (CN)

(72) Inventors: Changqi Hu, Shenzhen (CN); Yong Tian, Shenzhen (CN); Zijin Yuan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 176 days.

(21) Appl. No.: 15/391,362

(22) Filed: Dec. 27, 2016

(65) Prior Publication Data
US 2017/0111582 A1    Apr. 20, 2017

Related U.S. Application Data

(63) Continuation of application No. PCT/CN2015/081625, filed on Jun. 17, 2015.

(30) Foreign Application Priority Data

Jun. 30, 2014    (CN) .......................... 2014 1 0309376

(51) Int. Cl.
*H04N 5/232*    (2006.01)
*G06T 3/40*    (2006.01)
(Continued)

(52) U.S. Cl.
CPC ....... *H04N 5/23238* (2013.01); *G06K 9/6215* (2013.01); *G06T 3/4038* (2013.01);
(Continued)

(58) Field of Classification Search
CPC ... H04N 5/23238; H04N 5/3415; G03B 27/00
See application file for complete search history.

(56) References Cited

U.S. PATENT DOCUMENTS

| 5,187,754 A | 2/1993 | Currin et al. |
| 6,411,745 B1 * | 6/2002 | Tai ..................... H04N 1/40075 382/300 |

(Continued)

FOREIGN PATENT DOCUMENTS

| CN | 101276415 A | 10/2008 |
| CN | 103177432 A | 6/2013 |

(Continued)

OTHER PUBLICATIONS

Glocker, B.M., 2011. Random fields for image registration(Doctoral dissertation, Technische Universität München). (Year: 2011).*

(Continued)

*Primary Examiner* — Clifford Hilaire
(74) *Attorney, Agent, or Firm* — Conley Rose, P.C.

(57) ABSTRACT

A wide-area image acquiring method which includes capturing a global image in a preset wide-area visual area, capturing at least two partial images whose definition is preset and that are in the preset wide-area visual area, where the global image covers at least an overlap portion of view ranges of the partial images in the preset wide-area visual area, and a sum of the view ranges of the at least two partial images is greater than or equal to a view range of the global image, determining, in the global image, positions of edges of the partial images, based on same shot objects in the partial images and the global image, and performing splice processing on the at least two partial images according to the positions of the edges, to obtain a composite wide-area image of the wide-area visual area.

23 Claims, 13 Drawing Sheets

(51) Int. Cl.
- *G06T 7/33* (2017.01)
- *G06T 7/70* (2017.01)
- *G06K 9/62* (2006.01)
- *H04N 5/265* (2006.01)
- *H04N 17/00* (2006.01)

(52) U.S. Cl.
CPC .............. *G06T 7/33* (2017.01); *G06T 7/70* (2017.01); *H04N 5/265* (2013.01); *H04N 17/002* (2013.01); *G06T 2200/32* (2013.01); *G06T 2207/10016* (2013.01); *G06T 2207/30204* (2013.01); *G06T 2207/30208* (2013.01)

(56) References Cited

U.S. PATENT DOCUMENTS

| | | | |
|---|---|---|---|
| 6,701,030 | B1 | 3/2004 | Uyttendaele et al. |
| 7,095,905 | B1* | 8/2006 | Peterson ............... G06T 3/4038 348/36 |
| 2009/0021614 | A1 | 1/2009 | Baker et al. |
| 2011/0169921 | A1* | 7/2011 | Lee .................... H04N 5/23212 348/46 |
| 2012/0057053 | A1* | 3/2012 | Mallon .............. G01M 11/0264 348/241 |
| 2012/0274739 | A1 | 11/2012 | Li |
| 2013/0148911 | A1* | 6/2013 | Peterson ............... G06T 3/4038 382/284 |

FOREIGN PATENT DOCUMENTS

| | | |
|---|---|---|
| CN | 103338343 A | 10/2013 |
| CN | 103440664 A | 12/2013 |
| EP | 2109080 A1 | 10/2009 |
| EP | 2138976 A2 | 12/2009 |
| EP | 2475161 A1 | 7/2012 |

OTHER PUBLICATIONS

Kumara WG, Chang SM, Shih TK. Automatic panorama generation from a video with dynamic background. In2013 International Conference on Advances in ICT for Emerging Regions (ICTer) Dec. 11, 2013 (pp. 8-14). IEEE. (Year: 2013).*
Brown M, Lowe DG. Automatic panoramic image stitching using invariant features. International journal of computer vision. Aug. 1, 2007;74(1):59-73. (Year: 2007).*
Avidan, S. and Shamir, A., Aug. 2007, Seam carving for content-aware image resizing. In ACM Transactions on graphics (TOG) (vol. 26, No. 3, p. 10). ACM. (Year: 2007).*
Machine Translation and Abstract of Chinese Publication No. CN101276415, Oct. 1, 2008, 12 pages.
Machine Translation and Abstract of Chinese Publication No. CN103177432, Jun. 26, 2013, 6 pages.
Machine Translation and Abstract of Chinese Publication No. CN103338343, Oct. 2, 2013, 20 pages.
Machine Translation and Abstract of Chinese Publication No. CN103440664, Dec. 11, 2013, 11 pages.
Wang, J., et al., "A High Definition Video Surveillance Method and System," China Integrated Circuit, No. 10, Oct. 2012, 4 pages.
Foreign Communication From a Counterpart Application, Chinese Application No. 201410309376.0, Chinese Office Action dated Mar. 21, 2017, 8 pages.
Foreign Communication From a Counterpart Application, European Application No. 15815399.9, Extended European Search Report dated Jun. 7, 2017, 8 pages.
Foreign Communication From a Counterpart Application, PCT Application PCT/CN2015/081625, English Translation of International Search Report dated Sep. 14, 2015, 2 pages.
Foreign Communication From a Counterpart Application, PCT Application PCT/CN2015/081625, English Translation of Written Opinion dated Sep. 14, 2015, 6 pages.

* cited by examiner

WIDE-AREA IMAGE ACQUIRING METHOD AND APPARATUS

CROSS-REFERENCE TO RELATED APPLICATIONS

This application is a continuation of International Patent Application No. PCT/CN2015/081625, filed on Jun. 17, 2015, which claims priority to Chinese Patent Application No. 201410309376.0, filed on Jun. 30, 2014. The disclosures of the aforementioned applications are hereby incorporated by reference in their entireties.

TECHNICAL FIELD

Embodiments of the present disclosure relate to information technologies, and in particular, to a wide-area image acquiring method and apparatus.

BACKGROUND

Wide-angle images or wide-angle videos provide a new form of organizing spatio-temporal information, provide people with images or videos that are better than those of conventional common visual angles, bring new viewing experience, and have a wide prospect of application and extensive study values.

In other approaches, partial high-definition images of one large wide-angle visual area are separately obtained using multiple high-definition single-lens cameras, and then splice processing is performed on the captured partial high-definition images. For a wide-angle video, partial high-definition pictures of one large wide-angle visual area in each image frame are separately obtained using multiple video cameras, and then splice processing is performed on the partial high-definition pictures in each image frame. However, according to this method, a spliced image may have a deviation from an actual image, and a precision of the obtained image is not high.

SUMMARY

Embodiments of the present disclosure provide a wide-area image acquiring method and apparatus, to overcome a problem in the other approaches that a precision of an acquired image is not high.

A first aspect of the embodiments of the present disclosure provides a wide-area image acquiring method, including capturing a global image in a preset wide-area visual area, and capturing at least two partial images in the preset wide-area visual area, where the global image covers at least an overlap portion of view ranges of the partial images in the preset wide-area visual area, a sum of the view ranges covered by the at least two partial images is greater than or equal to a view range covered by the global image, and the view range refers to a maximum area covered by an image visual field, and determining, in the global image, positions that are of edges of the partial images, based on same shot objects that are in the partial images and also in the global image, and performing splice processing on the at least two partial images according to the positions that are of the edges of the partial images and that are in the global image, to obtain a composite wide-area image of the wide-area visual area.

With reference to the first aspect, in a first possible implementation manner of the first aspect, a resolution of the partial images is greater than a resolution of the global image, and before determining, in the global image, positions that are of edges of the partial images, based on same shot objects that are in the partial images and also in the global image, the method further includes adjusting a pixel quantity of the global image such that an adjusted pixel quantity of the same shot objects in the global image is the same as a pixel quantity of the same shot objects in the partial images.

With reference to the first possible implementation manner of the first aspect, in a second possible implementation manner of the first aspect, adjusting a pixel quantity of the global image further includes separately matching feature points of the at least two partial images with features points of the global image, and performing fitting on matched feature points, and performing interpolation calculation on fitted feature points, to obtain an adjusted global image.

With reference to the second possible implementation manner of the first aspect, in a third possible implementation manner of the first aspect, performing fitting on matched feature points, and performing interpolation calculation on fitted feature points, to obtain an adjusted global image includes obtaining an adjustment transformation matrix by means of fitting according to a position transformation relationship between the matched feature points in the partial images and the matched feature points in the global image, determining, according to the adjustment transformation matrix, positions that are of all first pixels in the global image and that are in the adjusted global image, and filling, with second pixels, positions that are in the adjusted global image and that are other than those of the first pixels, to obtain an adjusted image.

With reference to any one of the first aspect or the first to the third possible implementation manners of the first aspect, in a fourth possible implementation manner of the first aspect, before determining, in the global image, positions that are of edges of the partial images, based on same shot objects that are in the partial images and also in the global image, the method further includes separately performing alignment processing between the same shot objects in the at least two partial images and the same shot objects in the global image, to eliminate a visual difference between the at least two partial images.

With reference to the fourth possible implementation manner of the first aspect, in a fifth possible implementation manner of the first aspect, separately performing alignment processing between the same shot objects in the at least two partial images and the same shot objects in the global image includes determining the matched feature points that are in the partial images and that are in the global image, where the matched feature points are feature points whose color attributes of pixels are the same, and initially estimating, according to the matched feature points, the same shot objects that are in the partial images and that are in the global image, revising the initially estimated same shot objects according to a distance from a matching feature point in the at least two partial images to a neighboring pixel of the feature point, and a sum of offsets between all matched feature points in the partial images and all matched feature points in the global image using a Markov random field algorithm, where the offset is a sum of a first distance and a second distance, where the first distance is an offset distance between a matched feature point in the partial images and a matched feature point in the global image, and the second distance is an offset distance between a neighboring pixel of a matched feature point in the partial images and a neighboring pixel of a matched feature point in the global image, and performing deformation processing on the partial images according to the revised same shot objects that are in the partial images and that are in the global image such that the same shot objects in the at least two partial images are separately aligned with the same shot objects in the global image.

With reference to the fifth possible implementation manner of the first aspect, in a sixth possible implementation manner of the first aspect, determining the matched feature points that are in the partial images and that are in the global image, where the matched feature points are feature points whose color attributes of pixels are the same, and initially estimating, according to the matched feature points, the same shot objects that are in the partial images and that are in the global image includes performing the following operations on each first matched feature point that is in the partial images and that is in the global image using projection coordinates that are of the first feature point and that are in the partial images as a first estimation point, and acquiring an epipolar line that is of the first estimation point and that is in the global image, and searching the epipolar line of the first estimation point for a second feature point that matches the first feature point and that is in the global image, and using a set of the first feature point and a set of the second feature point as the same shot objects that are in the partial images and that are in the global image.

With reference to any one of the first aspect or the first to the sixth possible implementation manners of the first aspect, in a seventh possible implementation manner of the first aspect, before determining, in the global image, positions that are of edges of the partial images, based on same shot objects that are in the partial images and also in the global image, the method further includes capturing a first calibration image corresponding to the partial images and a second calibration image corresponding to the global image, where a visual area of the first calibration image includes at least one calibration board that is on a same plane, and a visual area of the second calibration image includes the calibration board in the visual area of the first calibration image, enlarging the second calibration image, and performing distortion correction processing on the second calibration image according to a distortion coefficient of the global image, to obtain a first corrected image of the global image, calculating a distortion coefficient of the partial images according to the first calibration image and the first corrected image, and performing distortion correction processing on the partial images according to the distortion coefficient of the partial images.

With reference to any one of the first aspect or the first to the seventh possible implementation manners of the first aspect, in an eighth possible implementation manner of the first aspect, determining, in the global image, positions that are of edges of the partial images, based on same shot objects that are in the partial images and also in the global image, and performing splice processing on the at least two partial images according to the positions that are of the edges of the partial images and that are in the global image, to obtain a composite wide-area image of the wide-area visual area further includes determining, according to color attributes of pixels in the partial images and color attributes of pixels in the global image, the same shot objects that are in the partial images and that are in the global image, determining, according to the same shot objects that are in the partial images and that are in the global image, the positions that are of the edges of the partial images and that are in the global image, determining an overlap area of the at least two partial images according to the positions that are of the edges of the partial images and that are in the global image, where the overlap area is an overlap area of the shot objects in the at least two partial images, and determining a splice joint between the at least two partial images according to the overlap area of the at least two partial images such that an image in the overlap area of the at least two partial images evenly transits, and performing splice processing on the at least two partial images according to the determined splice joint.

With reference to the eighth possible implementation manner of the first aspect, in a ninth possible implementation manner of the first aspect, before determining a splice joint between the at least two partial images, the method further includes filling a blackhole area in the partial images with pixels according to a shot object in the global image, where the blackhole area is a shot object that exists in the global image but cannot be displayed in the partial images due to mutual block by objects.

With reference to any one of the first aspect or the first to the ninth possible implementation manners of the first aspect, in a tenth possible implementation manner of the first aspect, view ranges of captured neighboring partial images partially overlap.

With reference to any one of the first aspect or the first to the tenth possible implementation manners of the first aspect, in an eleventh possible implementation manner of the first aspect, the global image is a dynamic image, and the partial images are dynamic images, capturing a global image in a preset wide-area visual area, and capturing at least two partial images in the preset wide-area visual area, where the global image covers at least an overlap portion of view ranges of the partial images in the preset wide-area visual area, a sum of the view ranges covered by the at least two partial images is greater than or equal to a view range covered by the global image includes capturing a global image that is in each frame and that is in the preset wide-area visual area and at least two partial images that are in each frame and that are in the preset wide-area visual area, where for each frame, the global image in the frame covers at least an overlap portion of view ranges of the partial images in the frame, and a sum of the view ranges covered by the at least two partial images in the frame is greater than or equal to a view range covered by the global image in the frame, and determining, in the global image, positions that are of edges of the partial images, based on same shot objects that are in the partial images and also in the global image, and performing splice processing on the at least two partial images according to the positions that are of the edges of the partial images and that are in the global image, to obtain a composite wide-area image of the wide-area visual area includes determining, for each frame, based on a same shot object that is in each of the partial images in the frame and that is in the global image in the frame, a position that is of an edge of each partial image in the frame and that is in the global image in the frame, and performing splice processing on the at least two partial images in the frame according to the position that is of the edge of each partial image in the frame and that is in the global image in the frame, to obtain a composite wide-area image that is in the frame and that is of the wide-area visual area.

A second aspect of the embodiments of the present disclosure provides a wide-area image acquiring apparatus, including a capture module configured to capture a global image in a preset wide-area visual area, and capture at least two partial images in the preset wide-area visual area, where the global image covers at least an overlap portion of view ranges of the partial images in the preset wide-area visual area, a sum of the view ranges covered by the at least two partial images is greater than or equal to a view range covered by the global image, and the view range refers to a maximum area covered by an image visual field, and a processing module configured to determine, in the global image, positions that are of edges of the partial images, based on same shot objects that are in the partial images and also in the global image, and perform splice processing on the at least two partial images according to the positions that are of the edges of the partial images and that are in the global image, to obtain a composite wide-area image whose definition is preset.

With reference to the second aspect, in a first possible implementation manner of the second aspect, a resolution of the partial images is greater than a resolution of the global image, and the apparatus further includes a global image adjustment module, where the global image adjustment module is configured to adjust a pixel quantity of the global image such that an adjusted pixel quantity of the same shot objects in the global image is the same as a pixel quantity of the same shot objects in the partial images before the processing module determines, in the global image, positions that are of edges of the partial images, based on same shot objects that are in the partial images and also in the global image.

With reference to the first possible implementation manner of the second aspect, in a second possible implementation manner of the second aspect, the global image adjustment module includes a feature point matching unit configured to separately perform feature point matching between the at least two partial images and the global image, where the matched feature points are feature points whose color attributes of pixels are the same, a fitting unit configured to perform fitting on the matched feature points, and an interpolation calculation unit configured to perform interpolation calculation on fitted feature points, to obtain an adjusted global image, where the adjusted pixel quantity of the same shot objects in the global image is the same as the pixel quantity of the same shot objects in the partial images.

With reference to the second possible implementation manner of the second aspect, in a third possible implementation manner of the second aspect, the fitting unit is further configured to obtain an adjustment transformation matrix by means of fitting according to a position transformation relationship between the matched feature points in the partial images and the matched feature points in the global image, and determine, according to the adjustment transformation matrix, positions that are of all first pixels in the global image and that are in the adjusted global image, and correspondingly, the interpolation calculation unit is further configured to fill, with second pixels, positions that are in the adjusted global image and that are other than those of the first pixels, to obtain an adjusted image.

With reference to any one of the second aspect or the first to the third possible implementation manners of the second aspect, in a fourth possible implementation manner of the second aspect, the apparatus further includes a parallax adjustment module configured to separately perform alignment processing between the same shot objects in the at least two partial images and the same shot objects in the global image, to eliminate a visual difference between the at least two partial images before the processing module determines, in the global image, positions that are of edges of the partial images, based on same shot objects that are in the partial images and also in the global image.

With reference to the fourth possible implementation manner of the second aspect, in a fifth possible implementation manner of the second aspect, the parallax adjustment module includes a shot object initial estimation unit configured to determine the matched feature points that are in the partial images and that are in the global image, where the matched feature points are feature points whose color attributes of pixels are the same, and initially estimate, according to the matched feature points, the same shot objects that are in the partial images and that are in the global image, a revision unit configured to revise the initially estimated same shot objects according to a distance from a matched feature point in the at least two partial images to a neighboring pixel of the feature point, and a sum of offsets between all matched feature points in the partial images and all matched feature points in the global image using a Markov random field algorithm, where the offset is a sum of a first distance and a second distance, where the first distance is an offset distance between a matched feature point in the partial images and a matched feature point in the global image, and the second distance is an offset distance between a neighboring pixel of a matched feature point in the partial images and a neighboring pixel of a matched feature point in the global image, and a shot object alignment processing unit configured to perform deformation processing on the partial images according to the revised same shot objects that are in the partial images and that are in the global image such that the same shot objects in the at least two partial images are separately aligned with the same shot objects in the global image.

With reference to the fifth possible implementation manner of the second aspect, in a sixth possible implementation manner of the second aspect, where the parallax adjustment module further includes a same shot object determining unit configured to perform the following operations on each first matched feature point that is in the partial images and that is in the global image using projection coordinates that are of the first feature point and that are in the partial images as a first estimation point, and acquiring an epipolar line that is of the first estimation point and that is in the global image, searching the epipolar line of the first estimation point for a second feature point that matches the first feature point and that is in the global image, and using a set of the first feature point and a set of the second feature point as the same shot objects that are in the partial images and that are in the global image.

With reference to any one of the second aspect or the first to the sixth possible implementation manners of the second aspect, in a seventh possible implementation manner of the second aspect, the parallax adjustment module further includes a partial image correction unit configured to capture a first calibration image corresponding to the partial images and a second calibration image corresponding to the global image before the processing module determines, in the global image, positions that are of edges of the partial images, based on same shot objects that are in the partial images and also in the global image, where a visual area of the first calibration image includes at least one calibration board that is on a same plane, and a visual area of the second calibration image includes the calibration board in the visual area of the first calibration image, enlarge the second calibration image, and perform distortion correction processing on the second calibration image according to a distortion coefficient of the global image, to obtain a first corrected image of the global image, calculate a distortion coefficient of the partial images according to the first calibration image and the first corrected image, and perform distortion correction processing on the partial images according to the distortion coefficient of the partial images.

With reference to any one of the second aspect or the first to the seventh possible implementation manners of the second aspect, in an eighth possible implementation manner of the second aspect, the processing module further includes a same shot object determining unit configured to determine, according to color attributes of pixels in the partial images and color attributes of pixels in the global image, the same shot objects that are in the partial images and that are in the global image, and a splice unit configured to determine, according to the same shot objects that are in the partial images and that are in the global image, the positions that are of the edges of the partial images and that are in the global image, determine an overlap area of the at least two partial images according to the positions that are of the edges of the partial images and that are in the global image, where the overlap area is an overlap area of the shot objects in the at least two partial images, and determine a splice joint between the at least two partial images according to the overlap area of the at least two partial images such that an image in the overlap area of the at least two partial images evenly transits, and perform splice processing on the at least two partial images according to the determined splice joint.

With reference to the eighth possible implementation manner of the second aspect, in a ninth possible implementation manner of the second aspect, the processing module further includes a filling unit configured to fill a blackhole area in the partial images with pixels according to a shot object in the global image before the processing module determines a splice joint between the at least two partial images, where the blackhole area is a shot object that exists in the global image but cannot be displayed in the partial images due to mutual block by objects.

With reference to any one of the second aspect or the first to the ninth possible implementation manners of the second aspect, in a tenth possible implementation manner of the second aspect, view ranges of neighboring partial images captured by the capture module partially overlap.

By means of a wide-area image acquiring method in the embodiments of the present disclosure, a global image in a preset wide-area visual area and at least two partial images in the preset wide-area visual area are captured, where the global image covers at least an overlap portion of view ranges of the partial images in the preset wide-area visual area, and a sum of the view ranges of the at least two partial images is greater than or equal to a view range of the global image, positions that are of edges of the partial images and that are in the global image are determined based on same shot objects that are in the partial images and that are in the global image, and then splice processing is performed on the at least two partial images according to the positions that are of the edges of the partial images and that are in the global image, to obtain a composite wide-area image of the wide-area visual area, which increases a precision of a spliced wide-area image.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
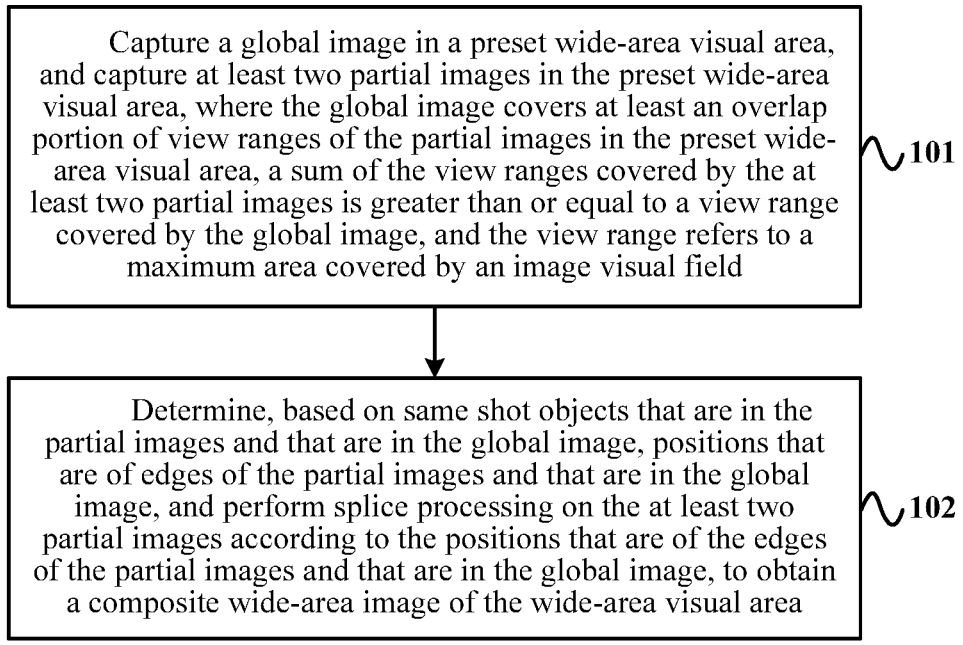
FIG. 1 is a flowchart of Embodiment 1 of a wide-area image acquiring method according to the present disclosure.

FIG. 1 is a flowchart of Embodiment 1 of a wide-area image acquiring method according to the present disclosure. As shown in FIG. 1, the method in this embodiment may include the following steps.

Step 101: Capture a global image in a preset wide-area visual area, and capture at least two partial images in the preset wide-area visual area, where the global image covers at least an overlap portion of view ranges of the partial images in the preset wide-area visual area, a sum of the view ranges covered by the at least two partial images is greater than or equal to a view range covered by the global image, and the view range refers to a maximum area covered by an image visual field.

An image shooting function of a camera may be seen as a process of emulating a human eye to observe a surrounding environment. In a shooting process, an optical center of the camera, that is, a shooting viewpoint, is equivalent to the human eye, and a size of a wide angle of the camera is equivalent to a size of a visual angle of the eye. A visual area may be a shot area that starts from a viewpoint or a near viewpoint, where the shot area may be jointly determined by a viewfinder direction of the camera and the wide angle size and a viewpoint of the camera. For example, starting from a viewpoint of a camera, on a ray in a shooting direction, there are infinite planes perpendicular to the ray, and a size and a position of an area that can be shot and that is on each plane is decided by a wide angle size of a shooting device and a distance from the plane to a shooting point, where the plane is generally a rectangle, and then infinite rectangles whose center points are located on the ray may be determined by means of the infinite planes, where the infinite rectangles may form a pyramid whose apex is the viewpoint, and the shot object may be shot by the camera when a shot object enters the pyramid, where the pyramid may be referred to as a shot area, that is, a visual area.

Shooting a shot object that enters a visual area to obtain an image is equivalent to that faces of shot objects are mapped to a plane, where the shot objects are in this visual area and are different in shapes or different in distances, and the faces face toward the lens and are not blocked. A view range of an image refers to a maximum area of the faces that are of these shot objects and that face toward the lens and are not blocked, where the maximum area can be displayed in the image, that is, a maximum area covered by an image visual field. This maximum area may not be a plane.

The wide-area visual area refers to a shot area that is determined by emulating a relatively large observation range of a human eye, and the preset wide-area visual area may be a relatively large shot area that is determined by a photographer in advance.

To obtain a composite wide-area image of a preset wide-area visual area, the present disclosure creatively considers to shoot a shot object that enters the preset wide-area visual area, to obtain a global image, shoot different portions of a shooting scenario that enter the preset wide-area visual area, to obtain at least two partial images, and use the global image as a reference image to splice the partial images, to obtain a composite wide-area image. The global image needs to cover at least an overlap portion of view ranges of the several partial images. Certainly, the global image may also cover all view ranges of the several partial images in the preset wide-area visual area. Further, to ensure that a view range of the spliced composite wide-area image covers a visual field range of the preset wide-area visual area determined by the photographer, a sum of the view ranges covered by the at least two partial images needs to be greater than or equal to a view range covered by the global image.

It should be noted that, capturing a global image in a preset wide-area visual area may be performed by a shooting device that has a wide-angle lens or an ultra-wide-angle lens. Capturing at least two partial images in the preset wide-area visual area may be performed by at least two shooting devices, where each shooting device has a standard lens or a high-definition lens. A definition of the composite wide-area image is inevitably equal to or less than a definition of the partial images. Therefore, the photographer may determine, according to an expected definition, a shooting device for capturing the partial images. Optionally, the shooting device may be a camera or a video camera.

In this embodiment of the present disclosure, a camera or a video camera that has a standard lens is briefly referred to as a standard camera in the following, and a camera or a video camera that has a wide-angle lens is briefly referred to as a wide-angle camera in the following. Further, for capturing at least two partial images in the preset wide-area visual area, view ranges of neighboring standard cameras of multiple standard cameras may be set to partially overlap, to ensure that splice processing may be performed on partial images captured by a standard lens or a high-definition lens, to obtain the composite wide-area image of the preset wide-area visual area.

Further, the definition of the partial images may be greater than or equal to a definition of the global image in the preset wide-area visual area.

Further, capturing a global image in a preset wide-area visual area, and capturing at least two partial images in the preset wide-area visual area may include enabling viewpoints for the wide-angle camera and the standard camera to capture images to be as near as possible.

For example, a wide-angle camera is located at a front and center position of a to-be-captured wide-area visual area, where the visual area covers a global preset wide-area visual area, and at a position that is as near as possible and that is in a horizontal direction or a vertical direction of the wide-angle camera, at least two standard cameras are distributed to capture partial images.

Further, capturing a global image in a preset wide-area visual area, and capturing at least two partial images in the preset wide-area visual area may further include enabling the at least two standard cameras to be symmetrically distributed around the wide-angle camera.

For example, capturing at least two partial images in the preset wide-area visual area may be capturing four partial images, where content of the partial images is separately the same as content of images that are captured from the top left corner, the top right corner, the bottom left corner, and the bottom right corner of the global image, a viewpoint of a standard camera for capturing the partial images is as near as possible to a viewpoint of the wide-angle camera, and view ranges of neighboring partial images of the partial images overlap.

Step 102: Determine, based on same shot objects that are in the partial images and that are in the global image, positions that are of edges of the partial images, and perform splice processing on the at least two partial images according to the positions that are of the edges of the partial images and that are in the global image, to obtain a composite wide-area image of the wide-area visual area.

Generally, a definition of a global image captured by a wide-angle camera that has a wide-angle lens or an ultra-wide-angle lens is relatively low, and to obtain a composite wide-area image that has a relatively high definition, splice processing needs to be performed on the at least two partial images. In a process of splice processing, shooting positions and/or shooting angles for the at least two partial images are different during the capturing. Therefore, image information, such as a shape or a size, of a same shot object is different in different cameras, and the at least two partial images generally cannot be directly spliced because neighboring edges of the at least two partial images have an overlap area. In this case, positions that are of edges of the partial images and that are in the global image may be determined according to spatial structure information of shot objects that is provided by the global image, that is, according to same shot objects (which may also be referred to as corresponding shot objects, which essentially refer to same objects that are shot in the partial images and the global image) in the partial images and the global image, and the splice processing may be performed on the at least two partial images according to the positions that are of the edges of the partial images and that are in the global image, to obtain a composite wide-area image that has a relatively high definition. The image information of the same shot object includes but is not limited to information such as a position, a shape, a size, a color, and brightness.

Determining, in the global image, positions that are of edges of the partial images, based on same shot objects that are in the partial images and also in the global image, and performing splice processing on the at least two partial images according to the positions that are of the edges of the partial images and that are in the global image, to obtain a composite wide-area image may further include determining, according to color attributes of pixels in the partial images and color attributes of pixels in the global image, the same shot objects that are in the partial images and that are in the global image, determining, according to the same shot objects that are in the partial images and that are in the global image, the positions that are of the edges of the partial images and that are in the global image, determining an overlap area of the at least two partial images according to the positions that are of the edges of the partial images and that are in the global image, where the overlap area is an overlap area of the shot objects in the at least two partial images, and determining a splice joint between the at least two partial images according to the overlap area of the at least two partial images such that an image in the overlap area of the at least two partial images evenly transits, and performing splice processing on the at least two partial images according to the determined splice joint.

By means of a wide-area image acquiring method provided in this embodiment, a global image in a preset wide-area visual area and at least two partial images in the preset wide-area visual area are captured, where the global image covers at least an overlap portion of view ranges of the partial images in the preset wide-area visual area, and a sum of the view ranges covered by the at least two partial images is greater than or equal to a view range covered by the global image, positions that are of edges of the partial images and that are in the global image are determined based on same shot objects that are in the partial images and that are in the global image, and then splice processing is performed on the at least two partial images according to the positions that are of the edges of the partial images and that are in the global image, to obtain a composite wide-area image whose definition is the same as that of the partial images, which increases an image precision in the wide-area image acquiring method.

Figure 2A:
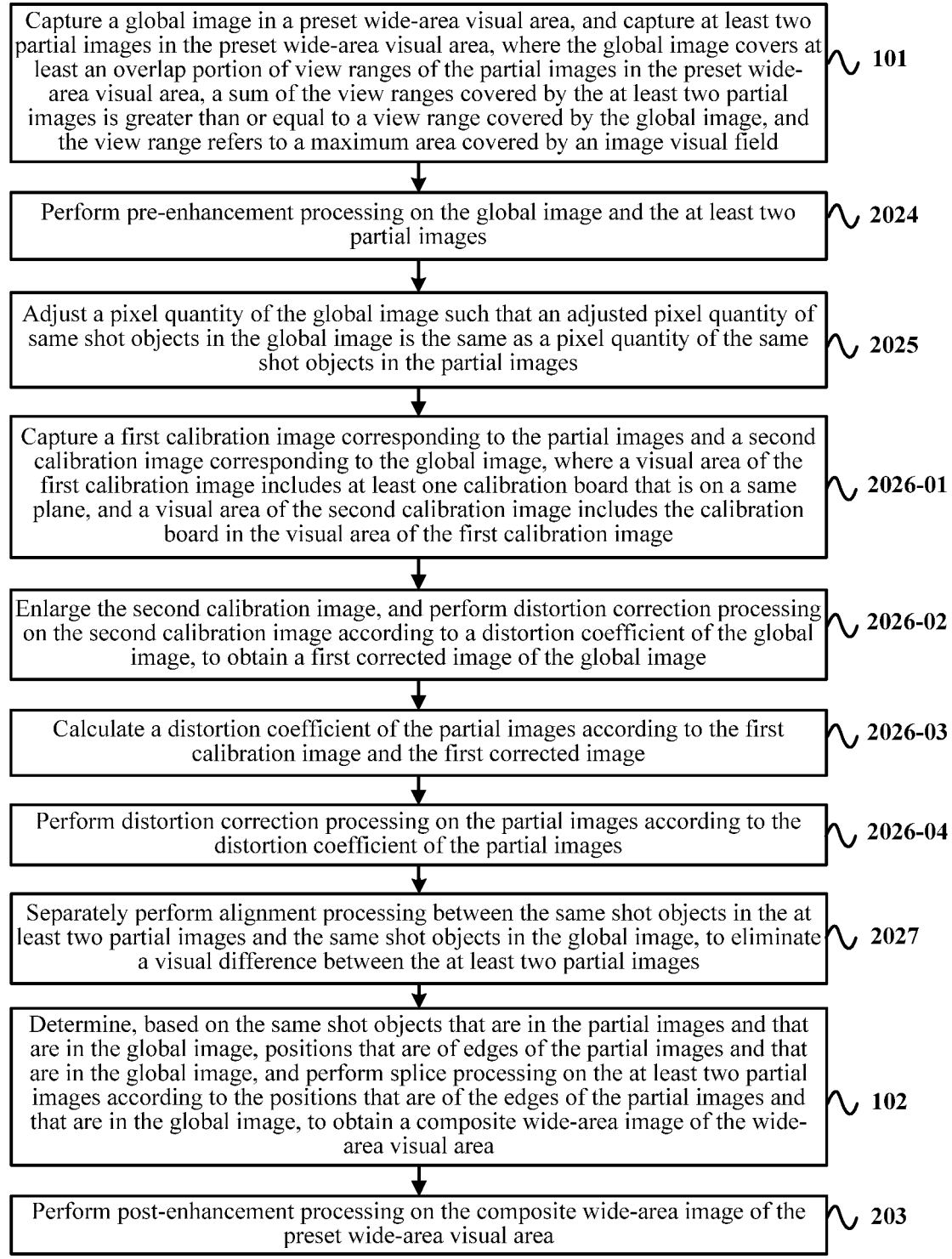
FIG. 2A is a flowchart of another optional implementation manner of the wide-area image acquiring method shown in FIG. 1.

FIG. 2A is a flowchart of another optional implementation manner of the wide-area image acquiring method shown in FIG. 1. To enable positions that are of edges of the partial images and that are in the global image to be more accurately acquired, and an expected resolution of a composite wide-area image to be the same as a resolution of the partial images, as shown in FIG. 2A, before the step 102 of determining, in the global image, positions that are of edges of the partial images, based on same shot objects that are in the partial images and also in the global image, this embodiment further include the following steps.

Step 2025: Adjust a pixel quantity of the global image such that an adjusted pixel quantity of same shot objects in the global image is the same as a pixel quantity of the same shot objects in the partial images.

It should be noted that, a view range of a single partial image is smaller than that of the global image. Therefore, a pixel quantity of a same shot object in the partial image is generally greater than a pixel quantity of the same shot object in the global image. For the purpose that the global image can be used as a reference image to splice the partial image, the pixel quantity of the same shot object in the global image needs to be the same as the pixel quantity of the same shot object in the partial image.

For example, if a total pixel quantity of the at least two partial images=a resolution of a camera for capturing the partial images*an image size of a single partial image*a quantity of the partial images, and a total pixel quantity of the global image=a resolution of a camera for capturing the global image*a size of the single global image*1, it indicates that a pixel quantity of a same shot object in the global image is less than a pixel quantity of the same shot object in the partial images when the total pixel quantity of the global image is less than the total pixel quantity of the at least two partial images, and therefore, the total pixel quantity of the global image needs to be adjusted, and optionally, the pixel quantity of the global image may be adjusted using a method for adjusting the resolution of the global image or adjusting both the resolution and the size.

Optionally, adjusting a pixel quantity of the global image further includes separately matching feature points of the at least two partial images with features points of the global image, performing fitting on matched feature points, and performing interpolation calculation on fitted feature points, to obtain an adjusted global image, where the matched feature points are feature points whose color attributes of pixels are the same.

The performing fitting on matched feature points, and performing interpolation calculation on fitted feature points, to obtain an adjusted global image may further include obtaining an adjustment transformation matrix by means of fitting according to a position transformation relationship between the matched feature points in the partial images and the matched feature points in the global image, determining, according to the adjustment transformation matrix, positions that are of all first pixels in the global image and that are in the adjusted global image, and filling, with second pixels, positions that are in the adjusted global image and that are other than those of the first pixels, to obtain an adjusted image.

The foregoing implementation manner is briefly described using a simplified example, as follows.

If a camera for capturing a partial image and a camera for capturing a global image are same cameras and use same setting of shooting parameters, and a quantity of partial images is 4, that is a resolution of the camera for capturing a partial image=a resolution of the camera for capturing a global image, and a pixel quantity of a single partial image=a pixel quantity of a single global image, a total pixel quantity of the global image is less than a total pixel quantity of the at least two partial images.

Then, adjustment processing may be performed on the global image, which may be that the global image is stretched by two times separately in a length direction and a width direction, an empty pixel after the stretch is filled with a color of a near pixel. It should be noted that, in the foregoing simplified example, deformation factors for the partial images and the global image are not considered, and feature point matching is performed directly using the stretch method. A person skilled in the art should understand that implementation manners of the present disclosure should not be limited thereto.

The pixel quantity of the global image is adjusted such that splice processing such as point-by-point matching and alignment may be performed, at a same pixel level, between the partial images and the global image.

Further, shooting positions and/or shooting angles for the at least two partial images are different during the capturing, and therefore a visual difference exists between the at least two partial images. To eliminate this visual difference, before the step 102 of determining, in the global image, positions that are of edges of the partial images, based on same shot objects that are in the partial images and also in the global image, the method further includes the following steps.

Step 2027: Separately perform alignment processing between the same shot objects in the at least two partial images and the same shot objects in the global image, to eliminate a visual difference between the at least two partial images.

The visual difference between the at least two partial images refers to that viewing angles of shot objects presented in the at least two partial images are different because the shooting positions and/or shooting angles for the at least two partial images are different during the capturing. This parallax difference is similar to a case in which images separately acquired by two human eyes have a slight position offset. In other words, an observer discovers that a spatial position relationship between content of partial images that are presented by a wide-area image that is synthesized by directly splicing the at least two partial images is not coordinated, and relative positions do not conform to spatial positions of actual shot objects. In this embodiment of the present disclosure, the alignment processing is separately performed between the same shot objects in the at least two partial images and the same shot objects in the global image, which can eliminate the parallax difference between the at least two partial images.

Optionally, separately performing alignment processing between the same shot objects in the at least two partial images and the same shot objects in the global image may be performed before determining an overlap area of the at least two partial images based on the positions that are of the edges of the partial images and that are in the global image, where the overlap area is an overlap area of the shot objects in the at least two partial images, and determining a splice joint between the at least two partial images according to the overlap area of the at least two partial images in step 102.

Figure 2B:
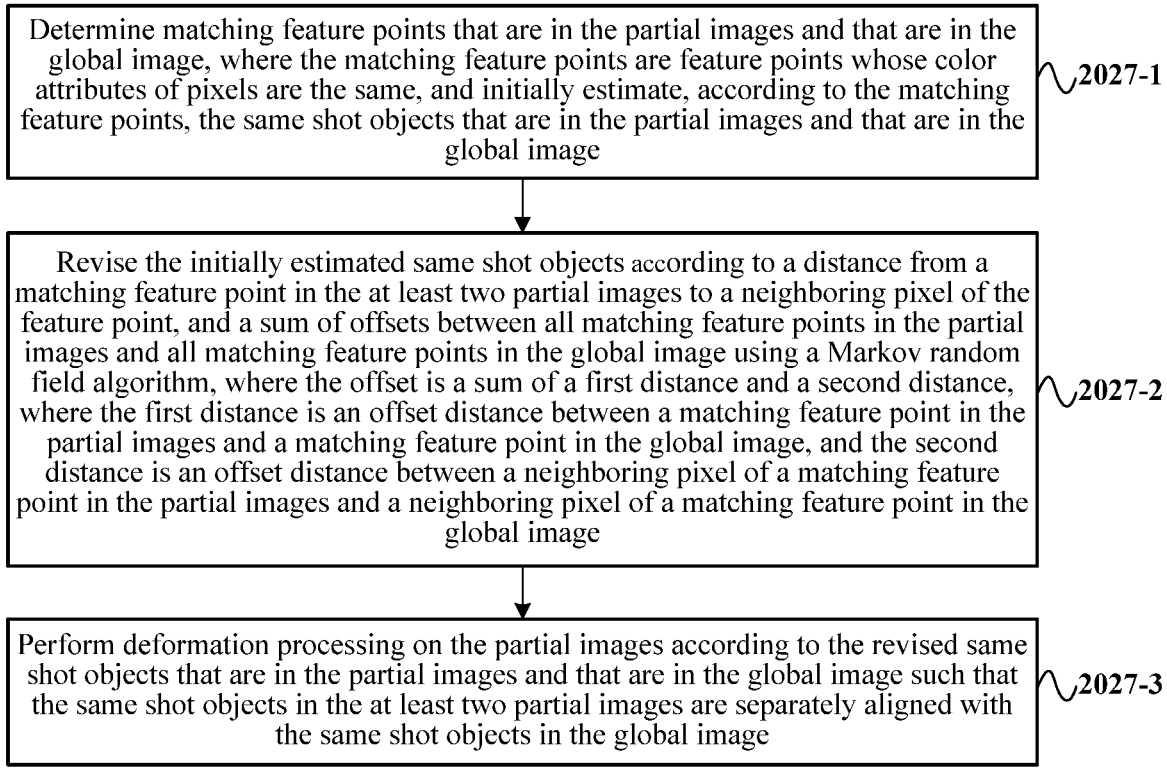
FIG. 2B is a detailed flowchart of step 2027 in the method shown in FIG. 2A.

Further, FIG. 2B is a detailed flowchart of step 2027 in the method shown in FIG. 2A. As shown in FIG. 2B, step 2027 of the separately performing alignment processing between the same shot objects in the at least two partial images and the same shot objects in the global image further includes the following steps.

Step 2027-1: Determine matched feature points that are in the partial images and that are in the global image, where the matched feature points are feature points whose color attributes of pixels are the same, and initially estimate, according to the matched feature points, the same shot objects that are in the partial images and that are in the global image.

Step 2027-2: Revise the initially estimated same shot objects according to a distance from a matched feature point in the at least two partial images to a neighboring pixel of the feature point, and a sum of offsets between all matched feature points in the partial images and all matched feature points in the global image using a Markov random field algorithm, where the offset is a sum of a first distance and a second distance, where the first distance is an offset distance between a matched feature point in the partial images and a matched feature point in the global image, and the second distance is an offset distance between a neighboring pixel of a matched feature point in the partial images and a neighboring pixel of a matched feature point in the global image.

Step 2027-3: Perform deformation processing on the partial images according to the revised same shot objects that are in the partial images and that are in the global image such that the same shot objects in the at least two partial images are separately aligned with the same shot objects in the global image.

Determining matched feature points that are in the partial images and that are in the global image refers to establishing a feature point matching correspondence between the same shot objects that are in the partial images and that are in the global image. To select the feature points is to select some points on a boundary of a target object according to color variation. Initially estimating, according to the feature points, the same shot objects that are in the partial images and that are in the global image refers to speculating a point-by-point matching relationship between another point in the partial images and the same shot objects in the global image according to a quantity of feature points whose matching relationship is determined.

Optionally, an optional implementation manner for obtaining the initial estimation in step 2027-1 further includes predicting points that are in the global image and that match points of positions most neighboring to the feature points in the partial images, and successively predicting points that are in the partial images and that match points of positions most neighboring to the predicted points in the global image, to obtain the pixel-by-pixel initial estimation of the same shot objects of the entire image.

There is another optional implementation manner for obtaining the initial estimation in step 2027-1. For details, refer to the following descriptions.

Optionally, the wide-area image acquiring method shown in FIG. 1 further includes a third optional implementation manner.

As shown in FIG. 2A, before determining, in the global image, positions that are of edges of the partial images, based on same shot objects that are in the partial images and also in the global image, the method may further include the following steps.

Step 2026-01: Capture a first calibration image corresponding to the partial images and a second calibration image corresponding to the global image, where a visual area of the first calibration image includes at least one calibration board that is on a same plane, and a visual area of the second calibration image includes the calibration board in the visual area of the first calibration image.

Step 2026-02: Enlarge the second calibration image, and perform distortion correction processing on the second calibration image according to a distortion coefficient of the global image, to obtain a first corrected image of the global image.

Step 2026-03: Calculate a distortion coefficient of the partial images according to the first calibration image and the first corrected image.

Step 2026-04: Perform distortion correction processing on the partial images according to the distortion coefficient of the partial images.

The distortion correction processing is performed on the partial images to eliminate distortions that are of the partial images and that are in a horizontal direction and a vertical direction. Distortion correction is performed on the subsequently captured partial images according to the distortion coefficient of the partial images, which may obtain a better splice effect. Similarly, the distortion correction processing is performed on the at least two partial images, which may obtain a better splice effect. In addition, the at least two partial images on which the distortion correction has been performed can coincide with an area of a calibration board in an image obtained after enlargement and distortion correction are performed on the global image.

Optionally, the distortion coefficient of the global image may be determined in advance using the following steps, including capturing a third calibration image corresponding to the global image in the preset wide-area visual area in advance, where the preset wide-area visual area includes a calibration board, enlarging the third calibration image corresponding to the global image in the preset wide-area visual area, and calculating the distortion coefficient of the global image according to the calibration image corresponding to the global image and the enlarged third calibration image.

Positions of a ruler on the calibration board in the third calibration images corresponding to the global image before and after the enlargement are compared such that the distortion coefficient of the global image can be obtained.

Optionally, the distortion correction processing may be performed on the global image according to the distortion coefficient of the global image.

A calculation method for the distortion coefficient of the global image is similar to a calculation method for the distortion coefficient of the partial images. Details are not described herein.

Optionally, the wide-area image acquiring method shown in FIG. 1 further includes a fourth optional implementation manner. Before performing splice processing on the at least two partial images according to the determined splice joint in step 102 and after step 2027-2, the method may include performing filtering and restriction processing on the corrected partial images.

The filtering and restriction processing is used to suppress noise in air flow field data obtained using the Markov random field algorithm.

Optionally, to improve image quality and a splice effect, the wide-area image acquiring method shown in FIG. 1 further includes a fifth optional implementation manner, and before step 102, includes the following steps.

Step 2024: Perform pre-enhancement processing on the global image and the at least two partial images.

Optionally, one or more types of processing such as image denoising, color balancing, and brightness balancing are performed on the global image and the at least two partial images.

Optionally, during the brightness balancing processing, an illumination parameter of the partial images may be recorded, to perform post-enhancement processing on the spliced composite wide-area image. Step 2024 may be performed before steps 2025 to 2027, or may be performed after steps 2025 to 2027.

Optionally, to improve image quality and a splice effect of the composite wide-area image, the wide-area image acquiring method shown in FIG. 1 further includes a sixth optional implementation manner, and after determining, in the global image, positions that are of edges of the partial images, based on same shot objects that are in the partial images and also in the global image, and performing splice processing on the at least two partial images according to the positions that are of the edges of the partial images and that are in the global image in step 102, the method includes the following step.

Step 203: Perform post-enhancement processing on the composite wide-area image of the preset wide-area visual area.

Optionally, the performing post-enhancement processing on the composite wide-area image may include performing cutting processing, illumination consistency processing, detail enhancement, and contrast enhancement on the composite wide-area image. The cutting processing can cut an irregular image boundary, and the illumination consistency processing may be performed according to the illumination parameter recorded in the pre-enhancement processing.

In this embodiment, a global image in a preset wide-area visual area and at least two partial images in the preset wide-area visual area are captured, where the global image covers at least an overlap portion of view ranges of the partial images in the preset wide-area visual area, and a sum of the view ranges covered by the at least two partial images is greater than or equal to a view range covered by the global image, positions that are of edges of the partial images and that are in the global image are determined based on same shot objects that are in the partial images and that are in the global image, and then splice processing is performed on the at least two partial images according to the positions that are of the edges of the partial images and that are in the global image, to obtain a composite wide-area image of the wide-area visual area, which increases an image definition in the wide-area image acquiring method.

Optionally, the initially estimating, according to the feature points, the same shot objects that are in the partial images and that are in the global image in step 2027-1 in this embodiment of the present disclosure may include another optional implementation manner, including performing the following operations on each first matched feature point that is in the partial images and that is in the global image. Using projection coordinates that are of the first feature point and that are in the partial images as a first estimation point, and acquiring an epipolar line that is of the first estimation point and that is in the global image, searching the epipolar line of the first estimation point for a second feature point that matches the first feature point and that is in the global image, and using a set of the first feature point and a set of the second feature point as the same shot objects that are in the partial images and that are in the global image.

In searching the epipolar line of the first estimation point for a second feature point, a geometry principle of the epipolar line is used. In short, in images that are of a same shot object and that are shot by different cameras, if a position of a shooting point of the shot object is determined in an image, that is, an estimation point, a corresponding point in another image must be on an epipolar line of the other image corresponding to the estimation point. In other words, the epipolar line of the point is searched for a point that is in the global image and that matches a point in the partial image, which may increase a speed of initially estimating a matching relationship between image content in the partial images and image content in the global image. This method for eliminating a visual difference between images involves a relatively small calculation amount, which not only increases an image synthesis speed, but also can reduce a performance requirement for an image synthesis processor.

Further, performing deformation processing on the partial images according to the revised same shot objects that are in the partial images and that are in the global image such that the same shot objects in the at least two partial images are separately aligned with the same shot objects in the global image in step 2027-3 may include another optional implementation manner, including separately assigning color values of points in the partial images to a point that is in the partial images and whose coordinates are the same as those of offset points of the points, to obtain a second corrected image corresponding to the partial images.

Further, an epipolar line that is of the points in the partial image and that is in the global image may be obtained in advance using the following steps, including determining a first plane, that is, an imaging plane of the partial images according to an optical center position, a focal length, a shooting direction, and a shooting wide angle of the standard camera for capturing the partial images, determining a second plane, that is, an imaging plane of the global image according to an optical center position, a focal length, a shooting direction, and a shooting wide angle of the wide-angle camera for capturing the global image, selecting a point on the first plane, and marking the point as a first calibration point, determining a third plane according to the optical center position of the standard camera, the optical center position of the wide-angle camera, and a position of the first calibration point in three-dimensional space, uniquely determining, according to the third plane and the second plane, a straight line between the two intersecting planes, where the straight line is an epipolar line that is of the first calibration point and that is on the second plane, and successively acquiring epipolar lines for points in a calibration area in the at least two partial images.

In a case in which the optical center position, the focal length, the shooting direction of the standard camera are determined, the first calibration point selected on the first plane may be a position of imaging that is of a point and that is on the imaging plane of the partial images, where the point has any depth of field and is on a ray that starts from the optical center position of the standard camera and passes through the first calibration point. According to the geometry principle of the epipolar line, all possible positions of imaging that are on the global image and that are of the point that has any depth of field and that is on the ray are the epipolar line of the first calibration point. In other words, according to a position of a point in the partial images and an epipolar line that is of the point and that is in the global image, the epipolar line in the global image may be searched for a matching point that is of the point in the partial images and that is in the global image, which reduces a search range, and simplifies a work amount of splice processing.

Optionally, feature points and matching points in the partial images and the global image may be separately acquired, to determine the first plane and the second plane. Optionally, feature points and matching points in the partial images and the first corrected image of the global image may be separately acquired, to determine the first plane and the second plane.

Optionally, a quantity of points and selection of positions of the points in the calibration area may be determined according to a definition need. For example, equidistant points in the calibration area may be selected to acquire an epipolar line.

Optionally, the epipolar line may be approximately in the horizontal direction, that is, only a deformation degree of image content in the horizontal direction is considered, to simplify an algorithm implementation difficulty.

In this embodiment of the present disclosure, the step of acquiring an epipolar line from several feature points in the partial images to mapped points in the global image in advance according to the geometry principle of the epipolar line, to obtain initial estimation of the matching relationship between the image content in the partial images and the image content in the global image can eliminate the visual difference between the partial images.

Optionally, if the capturing a global image in a preset wide-area visual area is capturing a 360-degree wide-angle image, the capturing at least two partial images in the preset wide-area visual area may be capturing more than two partial images, to ensure image quality of the partial images used for splice processing. For example, a capturing viewpoint of the global image is used as a center, and seven standard cameras are distributed at near points whose distances to the viewpoint are equal, to capture partial images. For another example, a capturing viewpoint of the global image is used as a center, and three standard cameras are separately distributed in four directions around the viewpoint, to capture partial images, where a standard lens in each direction is perpendicular or parallel to a standard lens in another direction.

In this embodiment of the present disclosure, a global image and at least two partial images in a preset wide-area visual area are acquired, and a series of splice processing such as revision, estimation, and alignment that are described above is performed on the at least two partial images using the global image as reference, which can obtain a composite wide-area image in which a visual difference is eliminated.

Figure 3:
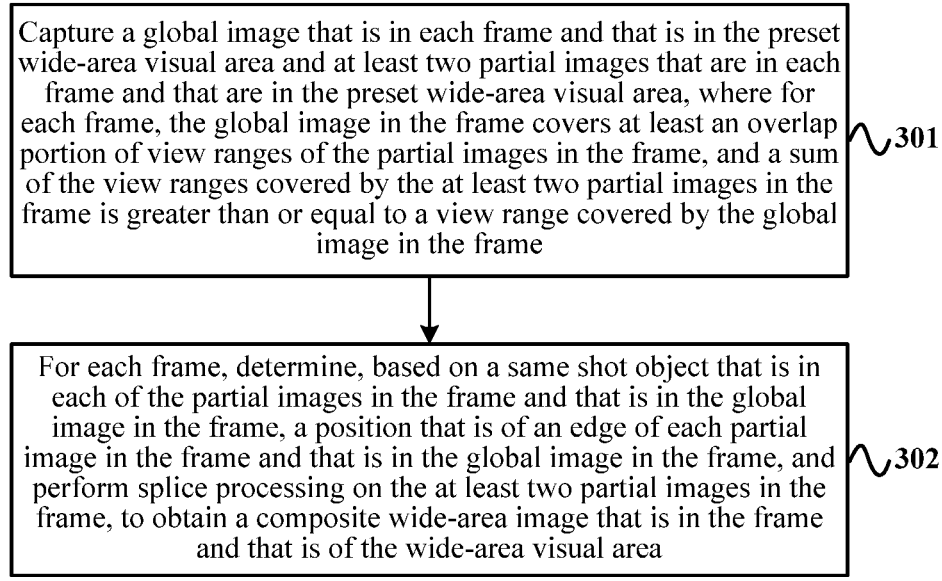
FIG. 3 is a flowchart of still another optional implementation manner of the wide-area image acquiring method shown in FIG. 1.

FIG. 3 is still another optional implementation manner of the wide-area image acquiring method shown in FIG. 1. When the wide-area image acquiring method provided in this embodiment of the present disclosure is applied to acquiring of a wide-area video, in another optional implementation manner further included in the wide-area image acquiring method shown in FIG. 1.

Step 101 of the capturing a global image in a preset wide-area visual area, and capturing at least two partial images in the preset wide-area visual area, where the global image covers at least an overlap portion of view ranges of the partial images in the preset wide-area visual area, a sum of the view ranges covered by the at least two partial images is greater than or equal to a view range covered by the global image further includes the following step.

Step 301: Capture a global image that is in each frame and that is in the preset wide-area visual area and at least two partial images that are in each frame and that are in the preset wide-area visual area, where for each frame, the global image in the frame covers at least an overlap portion of view ranges of the partial images in the frame, and a sum of the view ranges covered by the at least two partial images in the frame is greater than or equal to a view range covered by the global image in the frame.

For an implementation manner of step 301, refer to the description in step 101 in the previous embodiment. Details are not described herein.

Step 102 of determining, in the global image, positions that are of edges of the partial images, based on same shot objects that are in the partial images and also in the global image, and performing splice processing on the at least two partial images according to the positions that are of the edges of the partial images and that are in the global image, to obtain a composite wide-area image of the wide-area visual area further includes the following step.

Step 302: For each frame, determine, based on a same shot object that is in each of the partial images in the frame and that is in the global image in the frame, a position that is of an edge of each partial image in the frame and that is in the global image in the frame, and perform splice processing on the at least two partial images in the frame, to obtain a composite wide-area image that is in the frame and that is of the wide-area visual area.

A process for a video camera to capture a video is equivalent to a process of capturing consecutive images, that is, the wide-area video includes global images with consecutive frames. In other words, the acquiring of the wide-area video can be translated into acquiring of the global images with consecutive frames in the wide-area video. Each frame is a synchronous capturing cycle of the partial images and the global image. In each cycle, a corresponding quantity of partial images and the global image are captured. A step of acquiring each frame of wide-area image in the wide-area video is similar to step 102 in the wide-area image acquiring method in this embodiment of the present disclosure. Only difference is that, a video camera performs image splice processing using each frame as the unit. Details are not described herein.

Optionally, before step 302, the method may include temporarily storing the global image in the preset wide-area visual area in each frame and the at least two partial images in the preset wide-area visual area in each frame that are captured in step 301, to ensure that the global image in each frame is processed according to a sequence of capturing each frame.

Using several specific embodiments, the following describes in detail the technical solutions in the method embodiments shown in FIG. 1 to FIG. 3.

For example, this embodiment of the present disclosure is applied when a composite wide-area image is acquired. A global image in the preset wide-area visual area and four partial images in the preset wide-area visual area may be captured using one camera that has a wide-angle lens and four cameras that have standard lenses, to synthesize a wide-area image, where an optical center, a shooting direction, and a shooting distance of the camera that has the wide-angle lens may be determined according to a position of a shot area, as long as the shot area is globally covered, optical centers of the cameras that have the standard lenses may be placed at a position that is near the optical center of the camera that has the wide-angle lens, and shooting ranges are separately adjusted for the cameras that have the standard lenses, to respectively cover the top left corner, the top right corner, the bottom left corner, and the bottom right corner of the shot area, and it is ensured that a sum of the shooting ranges of the four cameras that have the standard lenses covers the entire shot area, and shooting ranges of neighboring cameras that have standard lenses overlap slightly. Similarly, when this embodiment of the present disclosure is applied to acquiring of a wide-area video, a global image in a preset wide-area visual area in each frame and four partial images in the preset wide-area visual area may be captured using one video camera that has a wide-angle lens and four video cameras that have standard lenses, to synthesize a wide-area image frame by frame, and finally obtain a wide-area video. The following provides detailed descriptions.

Figure 4A:
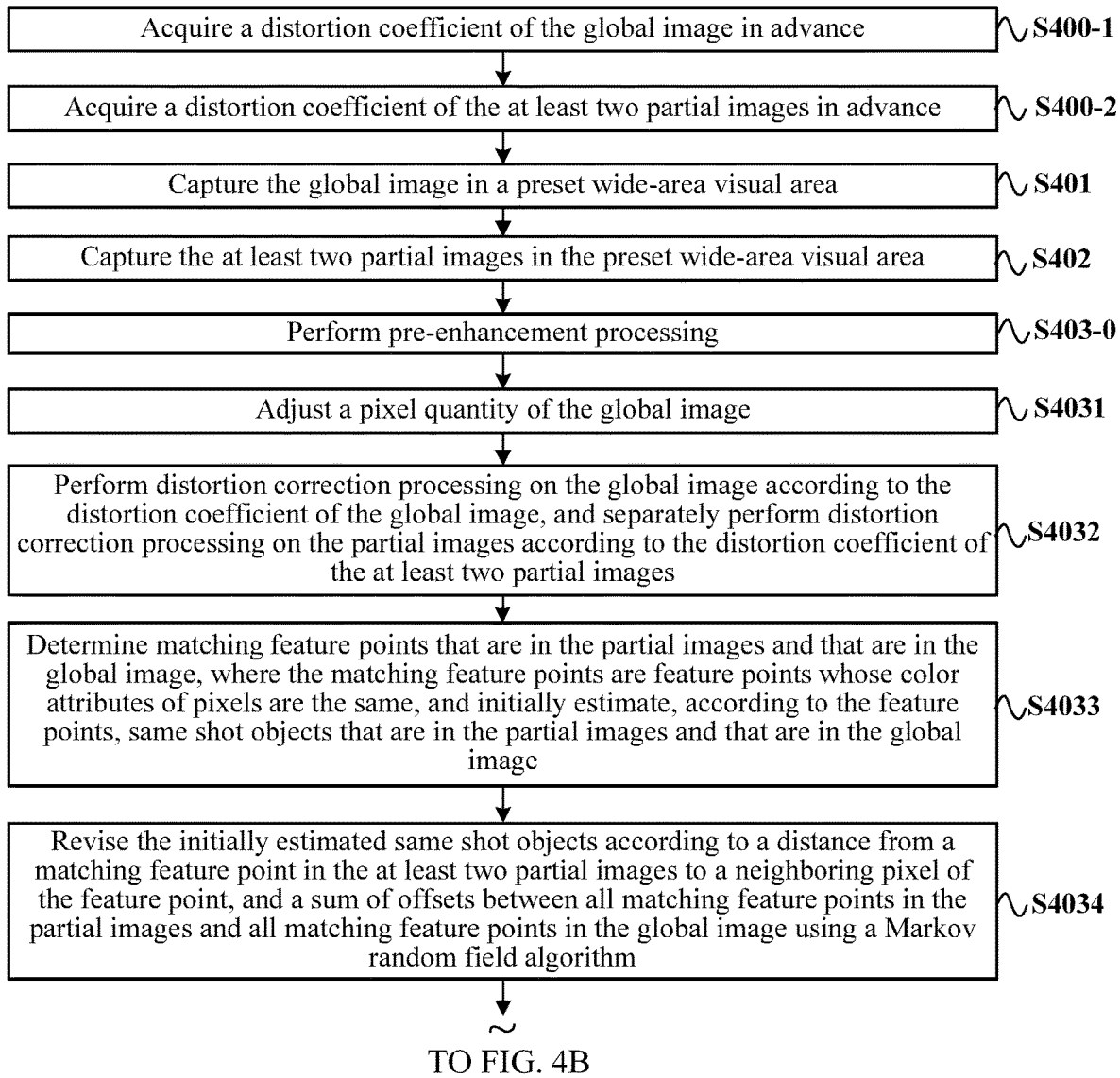
FIG. 4A and FIG. 4B are a flowchart of Embodiment 2 of a wide-area image acquiring method according to the present disclosure.
Figure 4B:
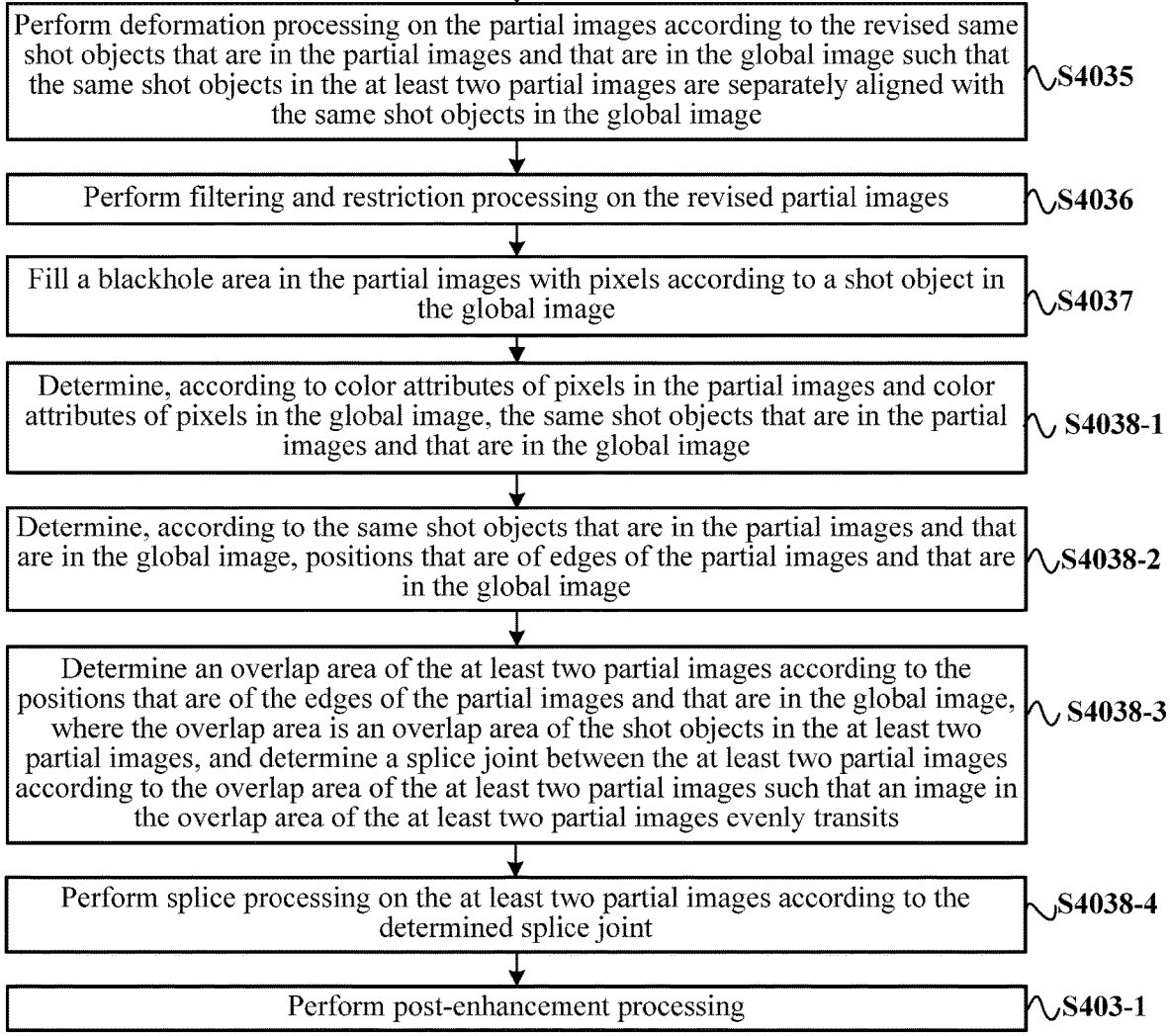
Figure 4C:
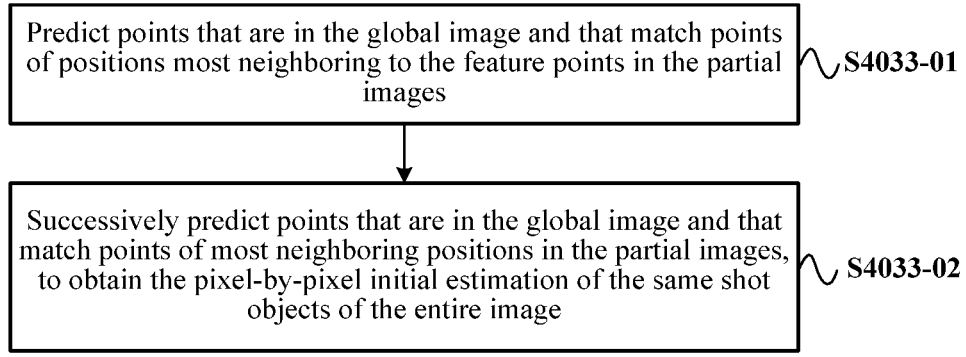
FIG. 4C is a flowchart of an optional implementation manner of step S4033 in the method shown in FIG. 4A and FIG. 4B.
Figure 4D:
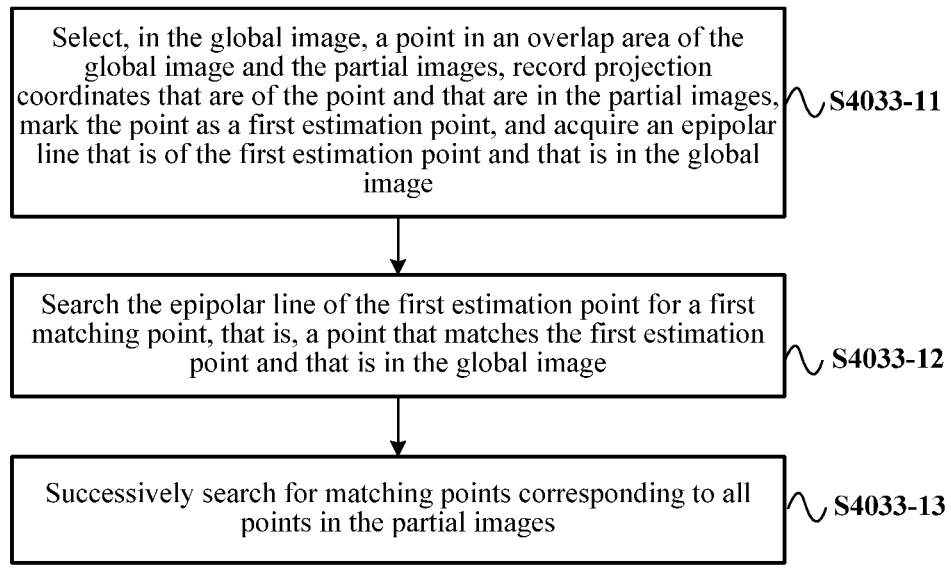
FIG. 4D is a flowchart of another optional implementation manner of step S4033 in the method shown in FIG. 4A and FIG. 4B.
Figure 5A:
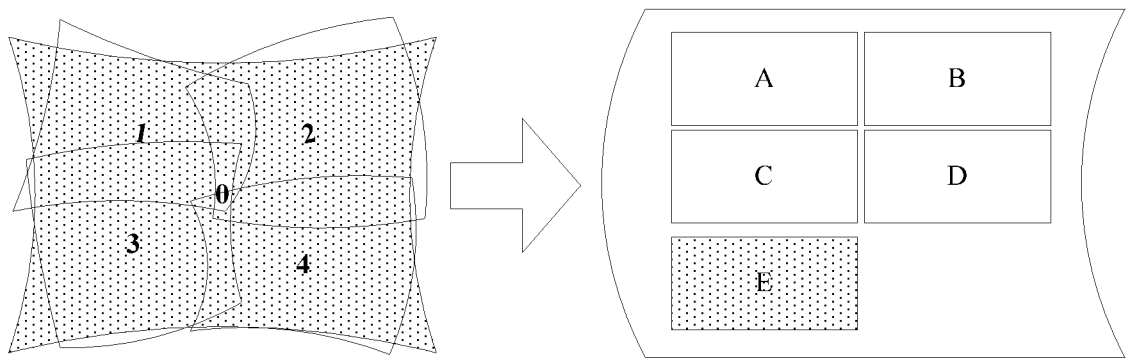
FIG. 5A is a schematic diagram of data processing of steps S401 and S402 in the method shown in FIG. 4A and FIG. 4B to FIG. 4D.
Figure 5B:
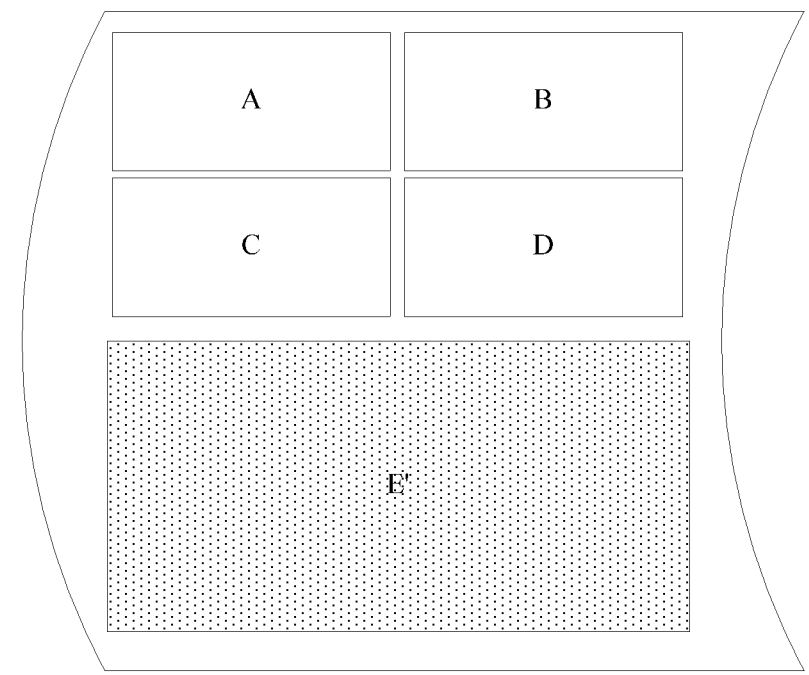
FIG. 5B is a schematic diagram of data processing of step S4031 in the method shown in FIG. 4A and FIG. 4B to FIG. 4D.
Figure 5C:
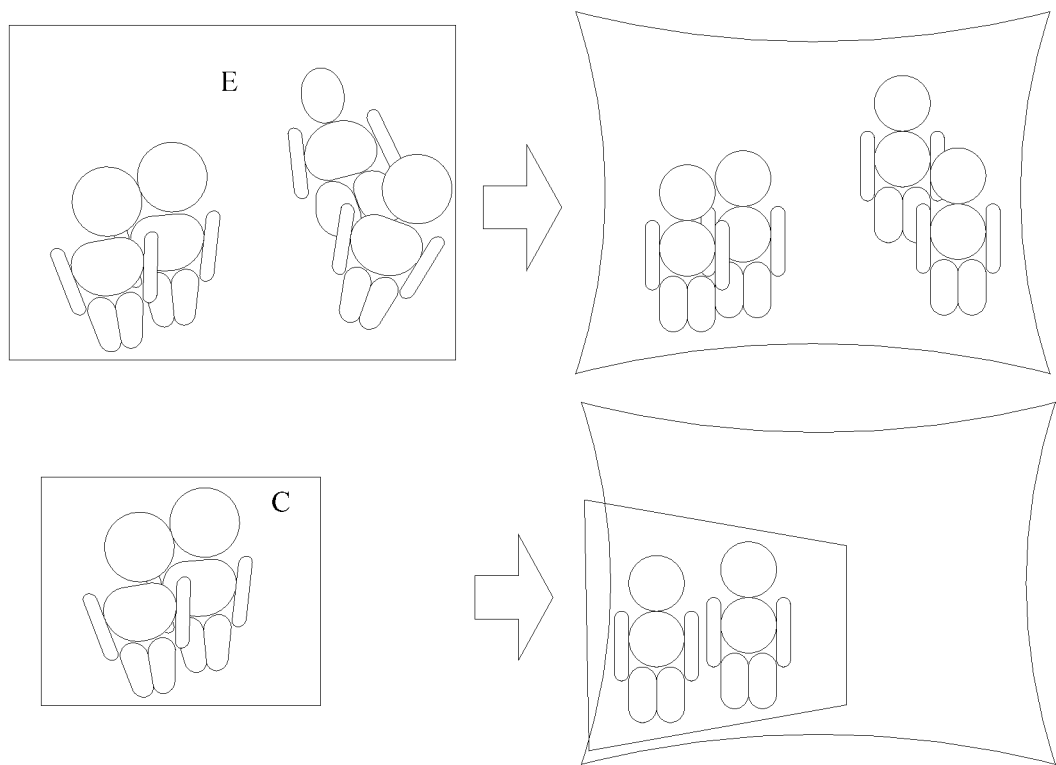
FIG. 5C is a schematic diagram of data processing of step S4032 in the method shown in FIG. 4A and FIG. 4B to FIG. 4D.
Figure 5D:
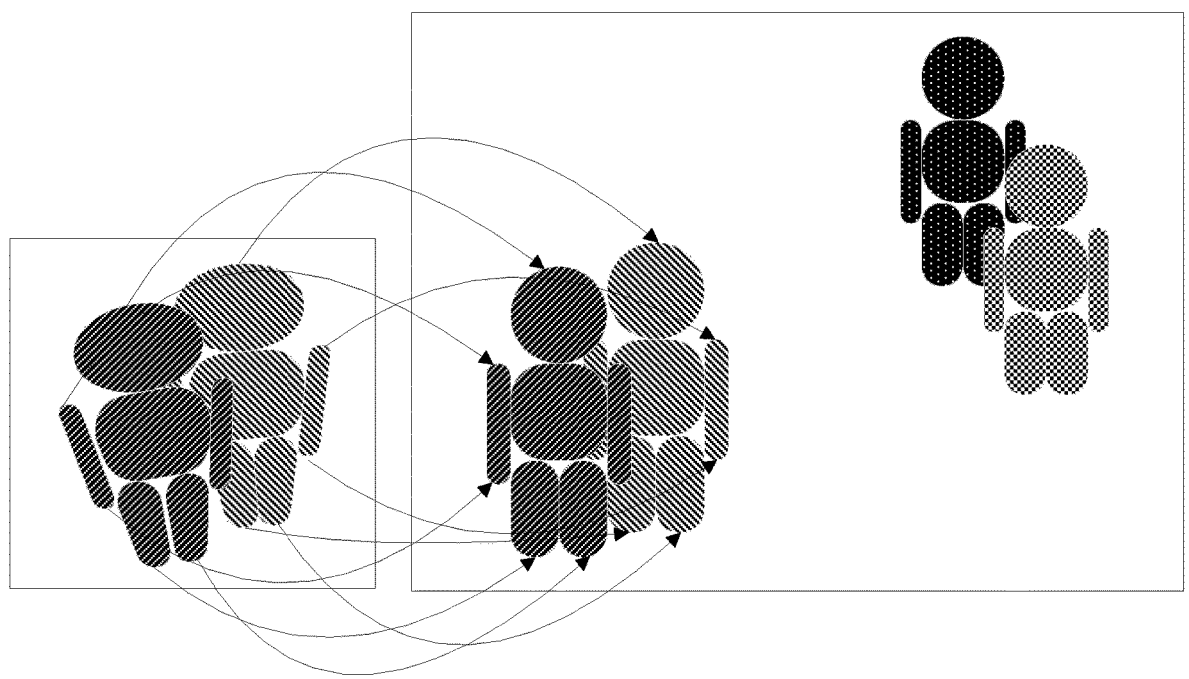
FIG. 5D is a schematic diagram of data processing of step S4033 in the method shown in FIG. 4A and FIG. 4B to FIG. 4D.
Figure 5E:
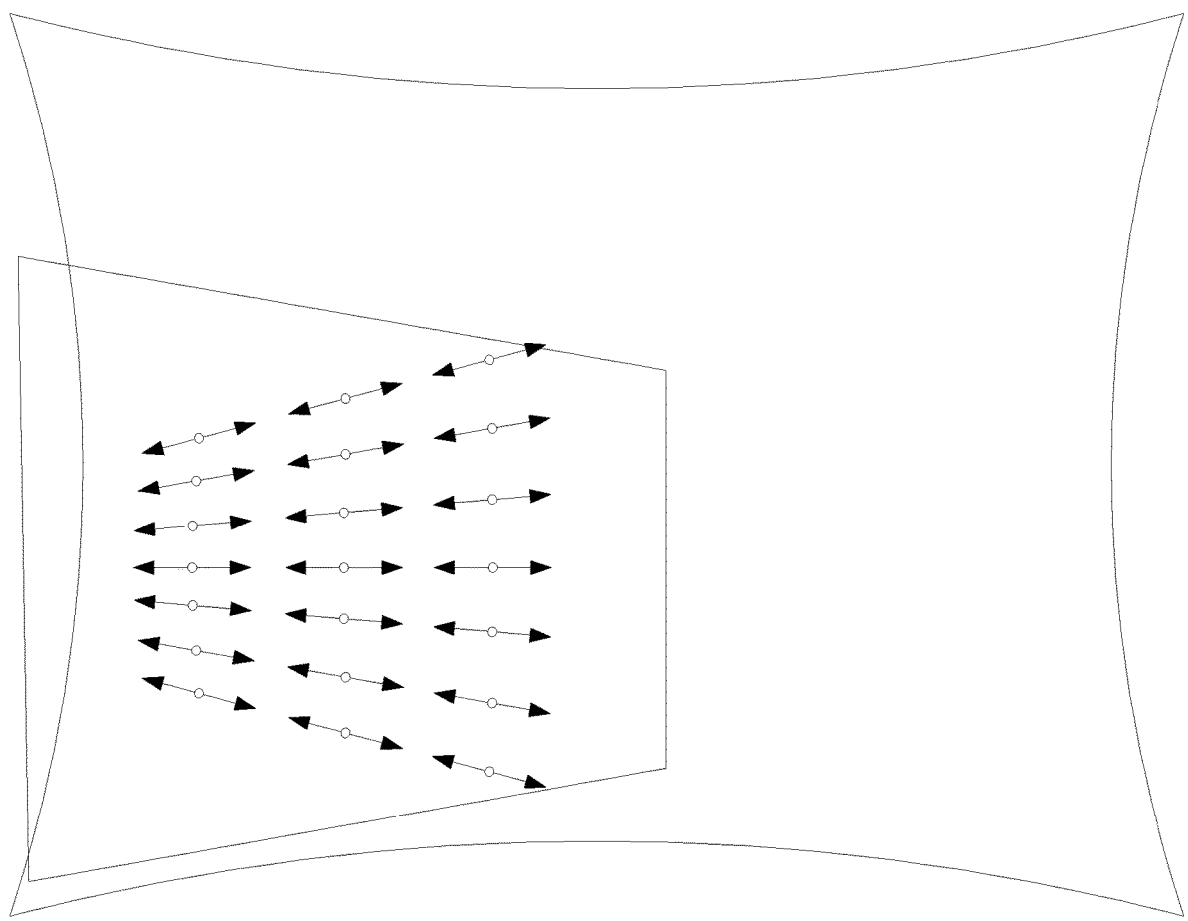
FIG. 5E is a schematic diagram of data processing of steps S4034-11, S4034-12, and S4034-13 in the method shown in FIG. 4A and FIG. 4B to FIG. 4D.
Figure 5F:
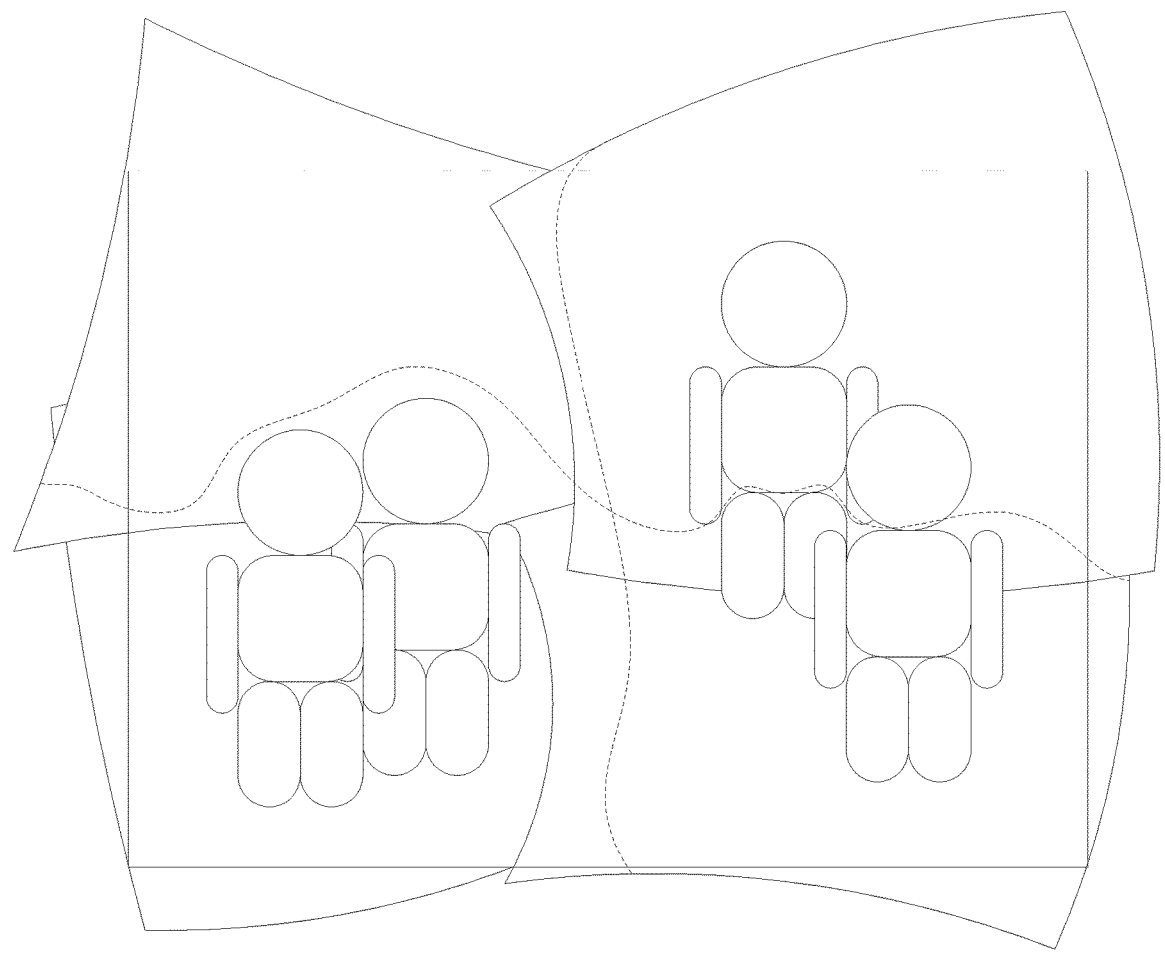
FIG. 5F is a schematic diagram of data processing of step S4038-3 in the method shown in FIG. 4A and FIG. 4B to FIG. 4D.
Figure 5G:
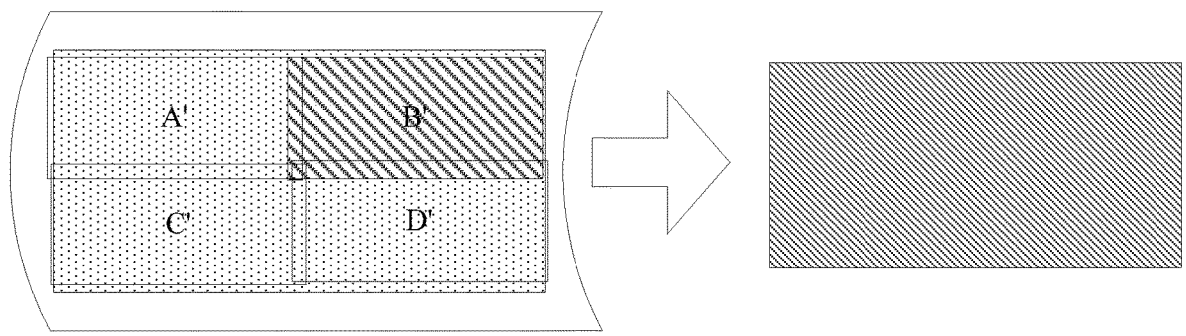
FIG. 5G is a schematic diagram of data processing of step S4038-4 in the method shown in FIG. 4A and FIG. 4B to FIG. 4D.

FIG. 4A and FIG. 4B are a flowchart of Embodiment 2 of a wide-area image acquiring method according to the present disclosure. FIG. 4C is a flowchart of an optional implementation manner of step S4033 in the method shown in FIG. 4A and FIG. 4B. FIG. 4D is a flowchart of another optional implementation manner of step S4033 in the method shown in FIG. 4A and FIG. 4B. FIG. 5A is a schematic diagram of data processing of step S401 and step S402 in the method shown in FIG. 4A and FIG. 4B to FIG. 4D. FIG. 5B is a schematic diagram of data processing of step S4031 in the method shown in FIG. 4A and FIG. 4B to FIG. 4D. FIG. 5C is a schematic diagram of data processing of step S4032 in the method shown in FIG. 4A and FIG. 4B to FIG. 4D. FIG. 5D is a schematic diagram of data processing of step S4033 in the method shown in FIG. 4A and FIG. 4B to FIG. 4D. FIG. 5E is a schematic diagram of data processing of steps S4033-11, S4033-12, and S4033-13 in the method shown in FIG. 4A and FIG. 4B to FIG. 4D. FIG. 5F is a schematic diagram of data processing of step S4038-3 in the method shown in FIG. 4A and FIG. 4B to FIG. 4D. FIG. 5G is a schematic diagram of data processing of step S4038-4 in the method shown in FIG. 4A and FIG. 4B to FIG. 4D.

As shown in FIG. 4A and FIG. 4B, the method in this embodiment may include the following steps.

Step S400-1: Acquire a distortion coefficient of the global image in advance.

Step S400-2: Acquire a distortion coefficient of the at least two partial images in advance.

The at least two partial images are described using four partial images as an example.

Step S401: Capture the global image in a preset wide-area visual area.

Step S402: Capture the at least two partial images in the preset wide-area visual area.

The at least two partial images are described using four partial images as an example. Data processing in steps S401 and S402 is shown in FIG. 5A, where 1, 2, 3, and 4 are visual areas covered by the partial images, and 0 is a visual area covered by the global image. Correspondingly, A, B, C, and D are the partial images, and E is the global image.

Step S403-0: Perform pre-enhancement processing.

The pre-enhancement processing may be any one or more of image denoising, color balancing, or brightness balancing.

Step 102, which is shown in FIG. 1, of the determining, in the global image, positions that are of edges of the partial images, based on same shot objects that are in the partial images and also in the global image, and performing splice processing on the at least two partial images according to the positions that are of the edges of the partial images and that are in the global image, to obtain a composite wide-area image of the wide-area visual area may further include the following step.

Step S4031: Adjust a pixel quantity of the global image. Data processing in step S4031 is shown in FIG. 5B.

Step S4032: Perform distortion correction processing on the global image according to the distortion coefficient of the global image, and separately perform distortion correction processing on the partial images according to the distortion coefficient of the at least two partial images.

Data processing in step S4032 is shown in FIG. 5C.

Step 102, which is shown in FIG. 1, of the separately performing alignment processing between the same shot objects in the at least two partial images and the same shot objects in the global image, to eliminate a visual difference between the at least two partial images may further include processing in steps S4033, S4033, and S4035.

Step S4033: Determine matched feature points that are in the partial images and that are in the global image, where the matched feature points are feature points whose color attributes of pixels are the same, and initially estimate, according to the feature points, same shot objects that are in the partial images and that are in the global image.

Data processing in step S4033 is shown in FIG. 5D. According to sparse feature point matching, the same shot objects in the partial images may basically coincide with the same shot objects in the global image, which is equivalent to determining approximate positions that are of the partial images and that are in the global image.

Optionally, step S4033 may further include the method in steps S4033-01 and S4033-02 of FIG. 4C or the method in steps S4033-11, S4033-12, and S4033-13 of FIG. 4D.

Step S4033-01: Predict points that are in the global image and that match points of positions most neighboring to the feature points in the partial images.

Step S4033-02: Successively predict points that are in the global image and that match points of most neighboring positions in the partial images, to obtain pixel-by-pixel initial estimation of the same shot objects of the entire image.

Step S4033-11: Select, in the global image, a point in an overlap area of the global image and the partial images, record projection coordinates that are of the point and that are in the partial images, mark the point as a first estimation point, and acquire an epipolar line that is of the first estimation point and that is in the global image.

Step S4033-12: Search the epipolar line of the first estimation point for a first matching point, that is, a point that matches the first estimation point and that is in the global image.

Step S4033-13: Successively search for matching points corresponding to all points in the partial images.

Data processing in steps S4033-11, S4033-12, and S4033-13 is shown in FIG. 5E.

Step S4034: Revise the initially estimated same shot objects according to a distance from a matched feature point in the at least two partial images to a neighboring pixel of the feature point, and a sum of offsets between all matched feature points in the partial images and all matched feature points in the global image using a Markov random field algorithm.

The offset is a sum of a first distance and a second distance, where the first distance is an offset distance between a matched feature point in the partial images and a matched feature point in the global image, and the second distance is an offset distance between a neighboring pixel of a matched feature point in the partial images and a neighboring pixel of a matched feature point in the global image.

Step S4035: Perform deformation processing on the partial images according to the revised same shot objects that are in the partial images and that are in the global image such that the same shot objects in the at least two partial images are separately aligned with the same shot objects in the global image.

Step S4036: Perform filtering and restriction processing on the revised partial images.

Step S4037: Fill a blackhole area in the partial images with pixels according to a shot object in the global image.

The blackhole area is a shot object that exists in the global image but cannot be displayed in the partial images due to mutual block by objects.

Step 102, which is shown in FIG. 1, of determining, in the global image, positions that are of edges of the partial images, based on same shot objects that are in the partial images and also in the global image, and performing splice processing on the at least two partial images according to the positions that are of the edges of the partial images and that are in the global image, to obtain a composite wide-area image of the wide-area visual area may further include processing in steps S4038-1, S4038-2, S4038-3, and S4038-4.

Step S4038-1: Determine, according to color attributes of pixels in the partial images and color attributes of pixels in the global image, the same shot objects that are in the partial images and that are in the global image.

Step S4038-2: Determine, according to the same shot objects that are in the partial images and that are in the global image, positions that are of edges of the partial images and that are in the global image.

Step S4038-3: Determine an overlap area of the at least two partial images according to the positions that are of the edges of the partial images and that are in the global image, where the overlap area is an overlap area of the shot objects in the at least two partial images, and determine a splice joint between the at least two partial images according to the overlap area of the at least two partial images such that an image in the overlap area of the at least two partial images evenly transits.

Data processing in step S4038-3 is shown in FIG. 5F.

Step S4038-4: Perform splice processing on the at least two partial images according to the determined splice joint.

Data processing in S4038-4 is shown in FIG. 5G.

Step S403-1: Perform post-enhancement processing.

Performing post-enhancement processing on the composite wide-area image whose definition is preset may include performing cutting processing, illumination consistency processing, detail enhancement, and contrast enhancement on the composite wide-area image whose definition is preset.

According to the implementation manner of the method shown in FIG. 1, a person skilled in the art should understand that, steps S400-1, S400-2, S403-0, S4031 to S4037, and S403-1 in this embodiment are optional steps in this embodiment of the present disclosure. For an optional scenario for the foregoing steps, refer to the implementation manner of the method shown in FIG. 1. Details are not described herein.

Figure 6:
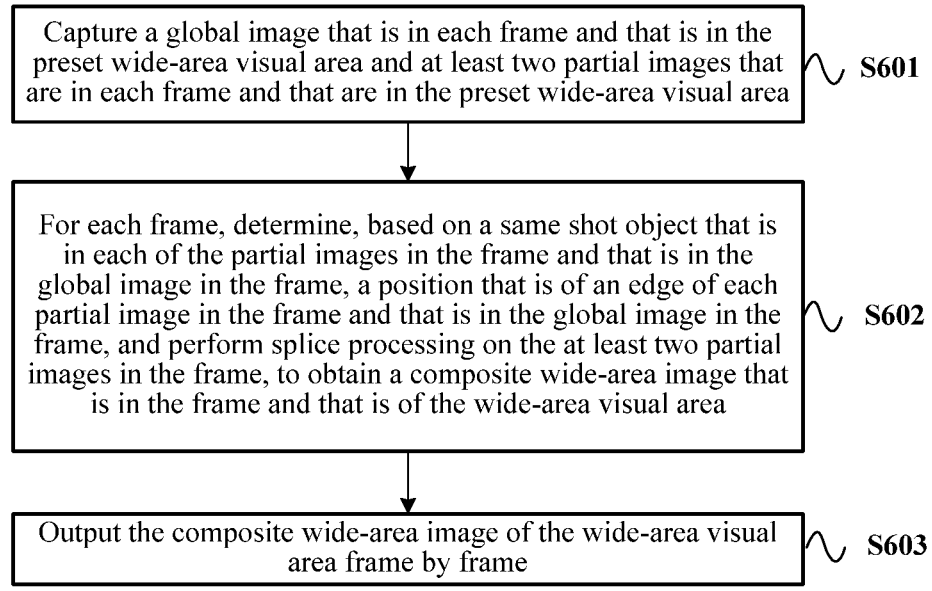
FIG. 6 is a flowchart of Embodiment 3 of a wide-area image acquiring method according to the present disclosure.
Figure 7:
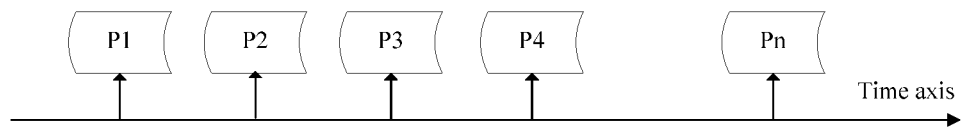
FIG. 7 is a schematic diagram of data processing of step S601 in the method shown in FIG. 6.
Figure 7:
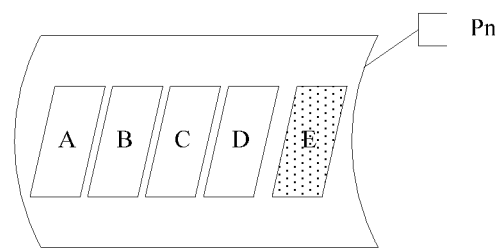

FIG. 6 is a flowchart of Embodiment 3 of a wide-area image acquiring method according to the present disclosure. FIG. 7 is a schematic diagram of data processing of step S601 in the method shown in FIG. 6. As shown in FIG. 6, the method in this embodiment may include the following steps.

Step S601: Capture a global image that is in each frame and that is in the preset wide-area visual area and at least two partial images that are in each frame and that are in the preset wide-area visual area.

For each frame, the global image in the frame covers at least an overlap portion of view ranges of the partial images in the frame, and a sum of the view ranges covered by the at least two partial images in the frame is greater than or equal to a view range covered by the global image in the frame.

Step S602: For each frame, determine, based on a same shot object that is in each of the partial images in the frame and that is in the global image in the frame, a position that is of an edge of each partial image in the frame and that is in the global image in the frame, and perform splice processing on the at least two partial images in the frame, to obtain a composite wide-area image that is in the frame and that is of the wide-area visual area.

Step S603: Output the composite wide-area image of the wide-area visual area frame by frame.

Data processing in step S601 is shown in FIG. 7, where P1, P2, P3, P4, and Pn indicate consecutive frames, and in each frame, partial images A, B, C, and D and a global image E are separately captured.

The implementation manners in the method shown in FIG. 1 to FIG. 5 may be used in other steps in this embodiment of the present disclosure, and the technical effect of the steps is the same. Details are not described herein.

Figure 8A:
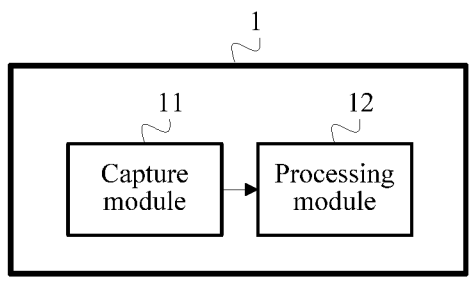
FIG. 8A is a schematic structural diagram of Embodiment 1 of a wide-area image acquiring apparatus according to the present disclosure.

FIG. 8A is a schematic structural diagram of Embodiment 1 of a wide-area image acquiring apparatus according to the present disclosure. As shown in FIG. 8A, the apparatus 1 in this embodiment may include a capture module 11 and a processing module 12.

The capture module 11 is configured to capture a global image in a preset wide-area visual area, and capture at least two partial images in the preset wide-area visual area, where the global image covers at least an overlap portion of view ranges of the partial images in the preset wide-area visual area, a sum of the view ranges of the at least two partial images is greater than or equal to a view range of the global image.

The processing module 12 is configured to determine, in the global image, positions that are of edges of the partial images, based on same shot objects that are in the partial images and also in the global image, and perform splice processing on the at least two partial images, to obtain a composite wide-area image of the wide-area visual area.

View ranges of neighboring partial images captured by the capture module 11 may partially overlap.

The apparatus 1 in this embodiment may be configured to execute the technical solutions of the method embodiments shown in FIG. 1 to FIG. 7. The implementation principles and technical effects are similar. Details are not described herein.

Figure 8B:
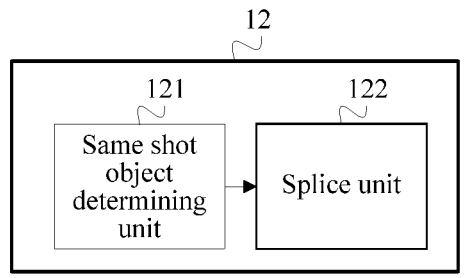
FIG. 8B is an optional schematic structural diagram of a processing module 12 in Embodiment 1 shown in FIG. 8A.

Optionally, FIG. 8B is an optional schematic structural diagram of a processing module 12 in Embodiment 1 shown in FIG. 8A. As shown in FIG. 8B, the processing module 12 further includes a same shot object determining unit 121 configured to determine, according to color attributes of pixels in the partial images and color attributes of pixels in the global image, the same shot objects that are in the partial images and that are in the global image, and a splice unit 122 configured to determine, according to the same shot objects that are in the partial images and that are in the global image, the positions that are of the edges of the partial images and that are in the global image, determine an overlap area of the at least two partial images according to the positions that are of the edges of the partial images and that are in the global image, where the overlap area is an overlap area of the shot objects in the at least two partial images, and determine a splice joint between the at least two partial images according to the overlap area of the at least two partial images such that an image in the overlap area of the at least two partial images evenly transits, and perform splice processing on the at least two partial images according to the determined splice joint.

The apparatus in this embodiment may be configured to execute the technical solutions of the method embodiments shown in FIG. 1 to FIG. 7. The implementation principles and technical effects are similar. Details are not described herein.

Figure 8C:
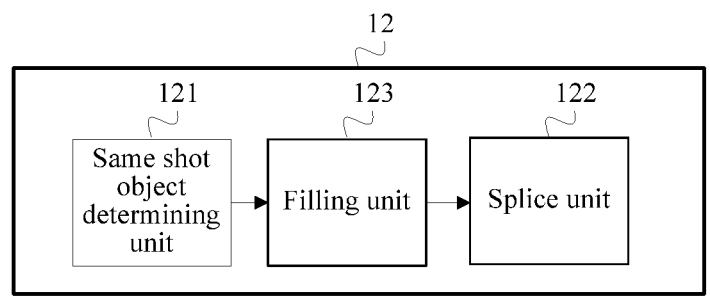
FIG. 8C is another optional schematic structural diagram of the processing module 12 in Embodiment 1 shown in FIG. 8A.

Optionally, FIG. 8C is another optional schematic structural diagram of a processing module 12 in Embodiment 1 shown in FIG. 8A. As shown in FIG. 8C, the processing module 12 further includes a filling unit 123 configured to fill a blackhole area in the partial images with pixels according to a shot object in the global image before the processing module 12 determines a splice joint between the at least two partial images, where the blackhole area is a shot object that exists in the global image but cannot be displayed in the partial images due to mutual block by objects. The apparatus 1 in this embodiment may be configured to execute the technical solutions of the method embodiments shown in FIG. 1 to FIG. 7. The implementation principles and technical effects are similar. Details are not described herein.

Figure 9A:
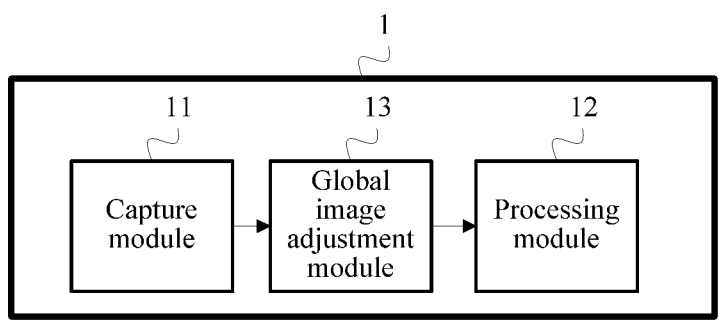
FIG. 9A is a schematic structural diagram of Embodiment 2 of a wide-area image acquiring apparatus according to the present disclosure.

FIG. 9A is a schematic structural diagram of Embodiment 2 of a wide-area image acquiring apparatus according to the present disclosure. As shown in FIG. 9A, on the basis of the apparatus 1 shown in FIG. 8A to FIG. 8C, the apparatus 1 in this embodiment of the present disclosure may further include a global image adjustment module 13.

A resolution of the partial images may be greater than a resolution of the global image, and the global image adjustment module 13 may be configured to adjust a pixel quantity of the global image before the processing module 12 determines, in the global image, positions that are of edges of the partial images, based on same shot objects that are in the partial images and also in the global image such that an adjusted pixel quantity of the same shot objects in the global image is the same as a pixel quantity of the same shot objects in the partial images.

The apparatus in this embodiment may be configured to execute the technical solutions of the method embodiments shown in FIG. 1 to FIG. 7. The implementation principles and technical effects are similar. Details are not described herein.

Figure 9B:
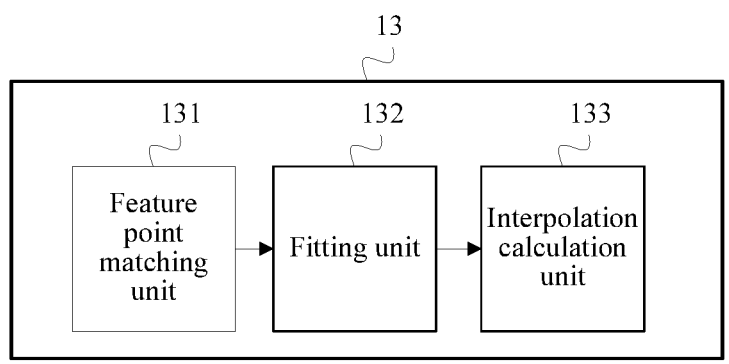
FIG. 9B is an optional schematic structural diagram of a global image adjustment module 13 in Embodiment 2 shown in FIG. 9A.

Optionally, FIG. 9B is an optional schematic structural diagram of a global image adjustment module 13 in Embodiment 2 shown in FIG. 9A. As shown in FIG. 9B, the global image adjustment module 13 includes a feature point matching unit 131 configured to separately perform feature point matching between the at least two partial images and the global image, where the matched feature points are feature points whose color attributes of pixels are the same, a fitting unit 132 configured to perform fitting on the matched feature points, and an interpolation calculation unit 133 configured to perform interpolation calculation on fitted feature points, to obtain an adjusted global image, where the adjusted pixel quantity of the same shot objects in the global image is the same as the pixel quantity of the same shot objects in the partial images.

Optionally, the fitting unit 132 may be further configured to obtain an adjustment transformation matrix by means of fitting according to a position transformation relationship between the matched feature points in the partial images and the matched feature points in the global image, and determine, according to the adjustment transformation matrix, positions that are of all first pixels in the global image and that are in the adjusted global image, and correspondingly, the interpolation calculation unit 133 may be further configured to fill, with second pixels, positions that are in the adjusted global image and that are other than those of the first pixels, to obtain an adjusted image.

The apparatus in this embodiment may be configured to execute the technical solutions of the method embodiments shown in FIG. 1 to FIG. 7. The implementation principles and technical effects are similar. Details are not described herein.

Figure 10A:
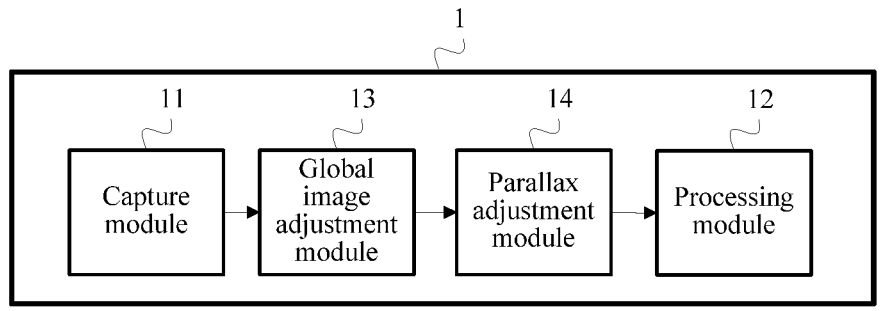
FIG. 10A is a schematic structural diagram of Embodiment 3 of a wide-area image acquiring apparatus according to the present disclosure.

FIG. 10A is a schematic structural diagram of Embodiment 3 of a wide-area image acquiring apparatus according to the present disclosure. As shown in FIG. 10A, on the basis of the apparatus 1 shown in FIG. 8A to FIG. 9B, the apparatus 1 in this embodiment of the present disclosure may further include a parallax adjustment module 14.

The parallax adjustment module 14 is configured to separately perform alignment processing between the same shot objects in the at least two partial images and the same shot objects in the global image, to eliminate a visual difference between the at least two partial images before the processing module 12 determines, in the global image, positions that are of edges of the partial images, based on same shot objects that are in the partial images and also in the global image.

It should be noted that, in this embodiment of the present disclosure, the global image adjustment module 13 is not a necessary unit, and may be selected by a person skilled in the art according to a specific situation.

The apparatus in this embodiment may be configured to execute the technical solutions of the method embodiments shown in FIG. 1 to FIG. 7. The implementation principles and technical effects are similar. Details are not described herein.

Figure 10B:
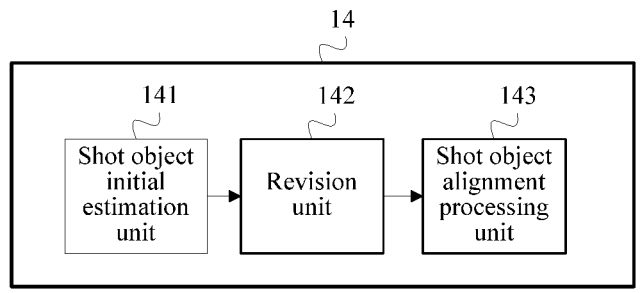
FIG. 10B is an optional schematic structural diagram of a parallax adjustment module 14 in Embodiment 3 shown in FIG. 10A.

Optionally, FIG. 10B is an optional schematic structural diagram of a parallax adjustment module 14 in Embodiment 3 shown in FIG. 10A. As shown in FIG. 10B, the parallax adjustment module 14 includes a shot object initial estimation unit 141 configured to determine the matched feature points that are in the partial images and that are in the global image, where the matched feature points are feature points whose color attributes of pixels are the same, and initially estimate, according to the matched feature points, the same shot objects that are in the partial images and that are in the global image, a revision unit 142 configured to revise the initially estimated same shot objects according to a distance from a matched feature point in the at least two partial images to a neighboring pixel of the feature point, and a sum of offsets between all matched feature points in the partial images and all matched feature points in the global image using a Markov random field algorithm, where the offset is a sum of a first distance and a second distance, where the first distance is an offset distance between a matched feature point in the partial images and a matched feature point in the global image, and the second distance is an offset distance between a neighboring pixel of a matched feature point in the partial images and a neighboring pixel of a matched feature point in the global image, and a shot object alignment processing unit 143 configured to perform deformation processing on the partial images according to the revised same shot objects that are in the partial images and that are in the global image such that the same shot objects in the at least two partial images are separately aligned with the same shot objects in the global image.

The apparatus 1 in this embodiment may be configured to execute the technical solutions of the method embodiments shown in FIG. 1 to FIG. 7. The implementation principles and technical effects are similar. Details are not described herein.

Figure 10C:
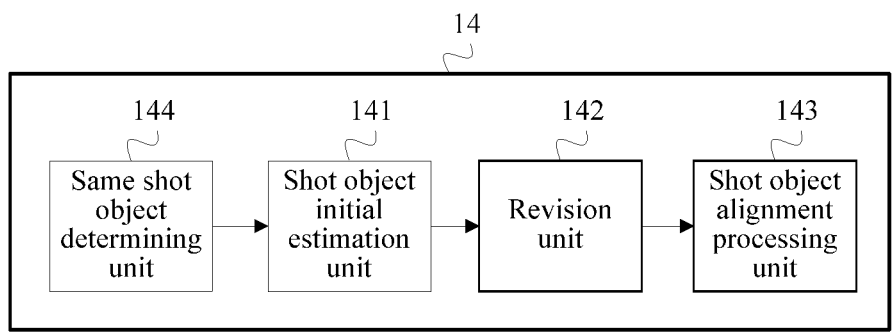
FIG. 10C is another optional schematic structural diagram of the parallax adjustment module 14 in Embodiment 3 shown in FIG. 10A.

Optionally, FIG. 10C is another optional schematic structural diagram of the parallax adjustment module 14 in Embodiment 3 shown in FIG. 10A. As shown in FIG. 10C, the parallax adjustment module 14 may further include a same shot object determining unit 144 configured to perform the following operations on each first matched feature point that is in the partial images and that is in the global image using projection coordinates that are of the first feature point and that are in the partial images as a first estimation point, and acquiring an epipolar line that is of the first estimation point and that is in the global image, searching the epipolar line of the first estimation point for a second feature point that matches the first feature point and that is in the global image, and using a set of the first feature point and a set of the second feature point as the same shot objects that are in the partial images and that are in the global image.

The apparatus in this embodiment may be configured to execute the technical solutions of the method embodiments shown in FIG. 1 to FIG. 7. The implementation principles and technical effects are similar. Details are not described herein.

Figure 10D:
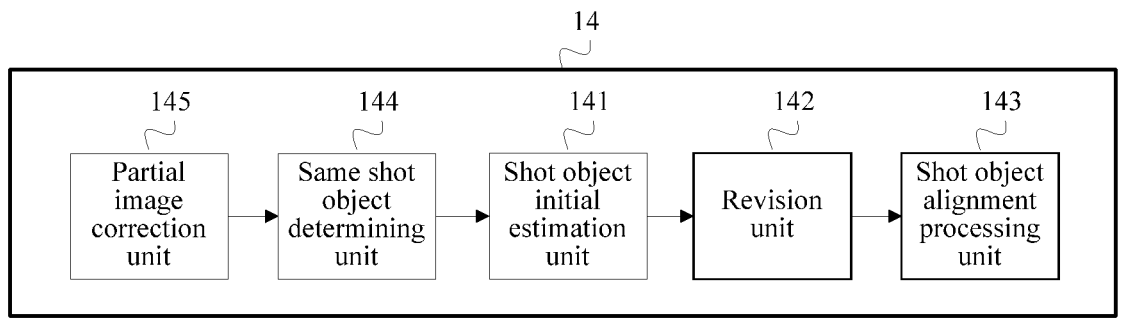
FIG. 10D is still another optional schematic structural diagram of the parallax adjustment module 14 in Embodiment 3 shown in FIG. 10A.

Optionally, FIG. 10D is still another optional schematic structural diagram of the parallax adjustment module 14 in Embodiment 3 shown in FIG. 10A. As shown in FIG. 10D, the parallax adjustment module 14 may further include a partial image correction unit 145 configured to capture a first calibration image corresponding to the partial images and a second calibration image corresponding to the global image before the processing module 12 determines, in the global image, positions that are of edges of the partial images, based on same shot objects that are in the partial images and also in the global image, where a visual area of the first calibration image includes at least one calibration board that is on a same plane, and a visual area of the second calibration image includes the calibration board in the visual area of the first calibration image, enlarge the second calibration image, and perform distortion correction processing on the second calibration image according to a distortion coefficient of the global image, to obtain a first corrected image of the global image, calculate a distortion coefficient of the partial images according to the first calibration image and the first corrected image, and perform distortion correction processing on the partial images according to the distortion coefficient of the partial images.

The apparatus in this embodiment may be configured to execute the technical solutions of the method embodiments shown in FIG. 1 to FIG. 7. The implementation principles and technical effects are similar. Details are not described herein.

Persons of ordinary skill in the art may understand that all or a part of the steps of the method embodiments may be implemented by a program instructing relevant hardware. The program may be stored in a computer readable storage medium. The steps of the method embodiments are performed when the program runs. The foregoing storage medium includes any medium that can store program code, such as a read-only memory (ROM), a random-access memory (RAM), a magnetic disc, or an optical disc.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A wide-area image acquiring method, comprising:
capturing a global image in a preset wide-area visual area using a wide-angle camera;
capturing at least two partial images in the preset wide-area visual area using at least two standard angle cameras that are distributed around the wide angle camera, wherein the global image covers an overlap area of view ranges of the partial images in the preset wide-area visual area, wherein a view range comprising the view ranges covered by the at least two partial images is greater than or equal to a view range covered by the global image, and wherein the view range of the global image or the two partial images refers to a maximum area covered by an image visual field;
determining, in the global image, positions of edges of the partial images based on same shot objects that are in the partial images and also in the global image; and
performing splice processing on the at least two partial images according to the determined positions of the edges to obtain a composite wide-area image of the wide-area visual area.

2. The wide-area image acquiring method of claim 1, wherein a resolution of the partial images is greater than a resolution of the global image, and wherein before determining, in the global image, the positions that are of edges of the partial images based on the same shot objects that are in the partial images and also in the global image, the wide-area image acquiring method further comprises adjusting a pixel quantity of the global image such that an adjusted pixel quantity of the same shot objects in the global image is the same as a pixel quantity of the same shot objects in the partial images.

3. The wide-area image acquiring method of claim 2, wherein adjusting the pixel quantity of the global image further comprises:
separately matching feature points of the at least two partial images with ature-feature points of the global image;
performing fitting on matched feature points, wherein the matched feature points are feature points whose color attributes of pixels are the same; and
performing interpolation calculation on fitted feature points to obtain an adjusted global image.

4. The wide-area image acquiring method of claim 3, wherein performing fitting on matched feature points, and performing interpolation calculation on fitted feature points to obtain the adjusted global image further comprises:
obtaining an adjustment transformation matrix by means of fitting according to a position transformation relationship between the matched feature points in the partial images and the matched feature points in the global image;
determining, according to the adjustment transformation matrix, positions that are of all first pixels in the global image and that are in the adjusted global image; and
filling, with second pixels, positions that are in the adjusted global image and that are other than those of the first pixels to obtain an adjusted image.

5. The wide-area image acquiring method of claim 1, wherein before determining, in the global image, the positions that are of edges of the partial images based on the same shot objects that are in the partial images and also in the global image, the wide-area image acquiring method further comprises separately performing alignment processing between the same shot objects in the at least two partial images and the same shot objects in the global image to eliminate a visual difference between the at least two partial images.

6. The wide-area image acquiring method of claim 5, wherein separately performing the alignment processing between the same shot objects in the at least two partial images and the same shot objects in the global image further comprises:
determining matching feature points that are in the partial images and that are in the global image, wherein the matched feature points are feature points whose color attributes of pixels are the same;
initially estimating, according to the matched feature points, the same shot objects that are in the partial images and that are in the global image;
revising the initially estimated same shot objects according to a distance from a matched feature point in the at least two partial images to a neighboring pixel of the feature point, and a sum of offsets between all matched feature points in the partial images and all matched feature points in the global image using a Markov random field algorithm, wherein the offset is a sum of a first distance and a second distance, wherein the first distance is an offset distance between a matched feature point in the partial images and a matched feature point in the global image, and wherein the second distance is an offset distance between a neighboring pixel of the matched feature point in the partial images and a neighboring pixel of the matched feature point in the global image; and
performing deformation processing on the partial images according to the revised same shot objects that are in the partial images and that are in the global image such that the same shot objects in the at least two partial images are separately aligned with the same shot objects in the global image.

7. The wide-area image acquiring method of claim 6, wherein determining the matched feature points that are in the partial images and that are in the global image, and initially estimating the same shot objects that are in the partial images and that are in the global image comprises:
performing the following operations on each first matched feature point that is in the partial images and that is in the global image:
setting projection coordinates that are of the first feature point and that are in the partial images as a first estimation point;
acquiring an epipolar line that is of the first estimation point and that is in the global image; and
searching the epipolar line of the first estimation point for a second feature point that matches the first feature point and that is in the global image; and
setting a set of the first feature point and a set of the second feature point as the same shot objects that are in the partial images and that are in the global image.

8. The wide-area image acquiring method of claim 1, wherein before determining, in the global image, the positions that are of edges of the partial images based on the same shot objects that are in the partial images and also in the global image, the wide-area image acquiring method further comprises:
- capturing a first calibration image corresponding to the partial images and a second calibration image corresponding to the global image, wherein a visual area of the first calibration image comprises at least one calibration board that is on a same plane, and wherein a visual area of the second calibration image comprises the calibration board in the visual area of the first calibration image;
- enlarging the second calibration image;
- performing distortion correction processing on the second calibration image according to a distortion coefficient of the global image to obtain a first corrected image of the global image;
- calculating a distortion coefficient of the partial images according to the first calibration image and the first corrected image of the global image; and
- performing the distortion correction processing on the partial images according to the distortion coefficient of the partial images.

9. The wide-area image acquiring method of claim 1, wherein determining, in the global image, the positions that are of edges of the partial images based on the same shot objects that are in the partial images and also in the global image, and performing splice processing on the at least two partial images to obtain the composite wide-area image of the wide-area visual area further comprises:
- determining, according to color attributes of pixels in the partial images and color attributes of pixels in the global image, the same shot objects that are in the partial images and that are in the global image;
- determining, according to the same shot objects that are in the partial images and that are in the global image, the positions that are of the edges of the partial images and that are in the global image;
- determining an overlap area of the at least two partial images according to the positions that are of the edges of the partial images and that are in the global image, wherein the overlap area is an overlap area of the shot objects in the at least two partial images;
- determining a splice joint between the at least two partial images according to the overlap area of the at least two partial images such that an image in the overlap area of the at least two partial images evenly transits; and
- performing the splice processing on the at least two partial images according to the determined splice joint.

10. The wide-area image acquiring method of claim 9, wherein before determining the splice joint between the at least two partial images, the wide-area image acquiring method further comprises filling a blackhole area in the partial images with pixels according to a shot object in the global image, wherein the blackhole area is a shot object that exists in the global image but cannot be displayed in the partial images due to mutual block by objects.

11. The wide-area image acquiring method of claim 1, wherein view ranges of captured neighboring partial images partially overlap.

12. The wide-area image acquiring method of claim 1, wherein the global image is a dynamic image, wherein the partial images are dynamic images, wherein capturing the global image in the preset wide-area visual area and capturing the at least two partial images in the preset wide-area visual area further comprises capturing a global image that is in each frame and that is in the preset wide-area visual area and at least two partial images that are in each frame and that are in the preset wide-area visual area, wherein the global image in the frame for each frame covers at least an overlap portion of view ranges of the partial images in the frame, wherein a sum of the view ranges covered by the at least two partial images in the frame is greater than or equal to a view range covered by the global image in the frame, and wherein determining, in the global image, the positions that are of edges of the partial images, based on the same shot objects that are in the partial images and also in the global image, and performing the splice processing on the at least two partial images to obtain the composite wide-area image of the wide-area visual area further comprises:
- determining, based on a same shot object that is in each of the partial images in the frame and that is in the global image in the frame, a position that is of an edge of each partial image in the frame and that is in the global image in the frame for each frame; and
- performing the splice processing on the at least two partial images in the frame according to the position that is of the edge of each partial image in the frame and that is in the global image in the frame to obtain the composite wide-area image that is in the frame and that is of the wide-area visual area.

13. A wide-area image acquiring apparatus, comprising:
- a wide-angle camera;
- at least two standard angle cameras;
- a memory; and
- a processor coupled to the memory and configured to:
  - capture a global image in a preset wide-area visual area using the wide-angle camera;
  - capture at least two partial images in the preset wide-area visual area using the at least two standard angle cameras that are distributed around the wide angle camera, wherein the global image covers an overlap area of view ranges of the partial images in the preset wide-area visual area, wherein a view range comprising the view ranges covered by the at least two partial images is greater than or equal to a view range covered by the global image, and wherein the view range of the global image or the two partial images refers to a maximum area covered by an image visual field;
  - determine, in the global image, positions that are of edges of the partial images, based on same shot objects that are in the partial images and also in the global image; and
  - perform splice processing on the at least two partial images according to the determined positions of the edges to obtain a composite wide-area image of the wide-area visual area.

14. The wide-area image acquiring apparatus of claim 13, wherein a resolution of the partial images is greater than a resolution of the global image, and wherein before determining, in the global image, the positions that are of edges of the partial images, based on the same shot objects that are in the partial images and also in the global image, the processor is further configured to adjust a pixel quantity of the global image such that an adjusted pixel quantity of the same shot objects in the global image is the same as a pixel quantity of the same shot objects in the partial images.

15. The wide-area image acquiring apparatus of claim 14, wherein the processor is further configured to:
- separately perform feature point matching between the at least two partial images and the global image, wherein the matched feature points are feature points whose color attributes of pixels are the same;

perform fitting on the matched feature points; and perform interpolation calculation on fitted feature points to obtain an adjusted global image.

16. The wide-area image acquiring apparatus of claim 15, wherein the processor is further configured to:

obtain an adjustment transformation matrix by means of fitting according to a position transformation relationship between the matched feature points in the partial images and the matched feature points in the global image;

determine, according to the adjustment transformation matrix, positions that are of all first pixels in the global image and that are in the adjusted global image; and fill, with second pixels, positions that are in the adjusted global image and that are other than those of the first pixels to obtain an adjusted image.

17. The wide-area image acquiring apparatus of claim 13, wherein before determining, in the global image, the positions that are of edges of the partial images, based on the same shot objects that are in the partial images and also in the global image, the processor is further configured to separately perform alignment processing between the same shot objects in the at least two partial images and the same shot objects in the global image to eliminate a visual difference between the at least two partial images.

18. The wide-area image acquiring apparatus of claim 17, wherein the processor is further configured to:

determine matching feature points that are in the partial images and that are in the global image, wherein the matched feature points are feature points whose color attributes of pixels are the same;

initially estimate, according to the matched feature points, the same shot objects that are in the partial images and that are in the global image;

revise the initially estimated same shot objects according to a distance from a matched feature point in the at least two partial images to a neighboring pixel of the feature point, and a sum of offsets between all matched feature points in the partial images and all matched feature points in the global image using a Markov random field algorithm, wherein the offset is a sum of a first distance and a second distance, wherein the first distance is an offset distance between a matched feature point in the partial images and a matched feature point in the global image, and wherein the second distance is an offset distance between a neighboring pixel of the matched feature point in the partial images and a neighboring pixel of the matched feature point in the global image; and perform deformation processing on the partial images according to the revised same shot objects that are in the partial images and that are in the global image such that the same shot objects in the at least two partial images are separately aligned with the same shot objects in the global image.

19. The wide-area image acquiring apparatus of claim 18, wherein the processor is further configured to perform the following operations on each first matched feature point that is in the partial images and that is in the global image:

set projection coordinates that are of the first feature point and that are in the partial images as a first estimation point;

acquire an epipolar line that is of the first estimation point and that is in the global image;

search the epipolar line of the first estimation point for a second feature point that matches the first feature point and that is in the global image; and set a set of the first feature point and a set of the second feature point as the same shot objects that are in the partial images and that are in the global image.

20. The wide-area image acquiring apparatus of claim 17, wherein before determining, in the global image, the positions that are of edges of the partial images, based on the same shot objects that are in the partial images and also in the global image, the processor is further configured to:

capture a first calibration image corresponding to the partial images and a second calibration image corresponding to the global image, wherein a visual area of the first calibration image comprises at least one calibration board that is on a same plane, and wherein a visual area of the second calibration image comprises the calibration board in the visual area of the first calibration image;

enlarge the second calibration image;

perform distortion correction processing on the second calibration image according to a distortion coefficient of the global image to obtain a first corrected image of the global image;

calculate a distortion coefficient of the partial images according to the first calibration image and the first corrected image of the global image; and perform the distortion correction processing on the partial images according to the distortion coefficient of the partial images.

21. The wide-area image acquiring apparatus of claim 13, wherein the processor is further configured to:

determine, according to color attributes of pixels in the partial images and color attributes of pixels in the global image, the same shot objects that are in the partial images and that are in the global image;

determine, according to the same shot objects that are in the partial images and that are in the global image, the positions that are of the edges of the partial images and that are in the global image;

determine an overlap area of the at least two partial images according to the positions that are of the edges of the partial images and that are in the global image, wherein the overlap area is an overlap area of the shot objects in the at least two partial images;

determine a splice joint between the at least two partial images according to the overlap area of the at least two partial images such that an image in the overlap area of the at least two partial images evenly transits; and perform the splice processing on the at least two partial images according to the determined splice joint.

22. The wide-area image acquiring apparatus of claim 21, wherein before determining the splice joint between the at least two partial images, the processor is further configured to fill a blackhole area in the partial images with pixels according to a shot object in the global image, wherein the blackhole area is a shot object that exists in the global image but cannot be displayed in the partial images due to mutual block by objects.

23. The wide-area image acquiring apparatus of claim 13, wherein view ranges of neighboring partial images partially overlap.

* * * * *

UNITED STATES PATENT AND TRADEMARK OFFICE
CERTIFICATE OF CORRECTION

PATENT NO. : 10,609,282 B2
APPLICATION NO. : 15/391362
DATED : March 31, 2020
INVENTOR(S) : Hu et al.

It is certified that error appears in the above-identified patent and that said Letters Patent is hereby corrected as shown below:

In the Claims

Claim 3, Column 27, Line 49:
"with ature-feature points"
Should read:
"with feature points"

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*